(12) United States Patent
Furuta

(10) Patent No.: US 9,623,770 B2
(45) Date of Patent: Apr. 18, 2017

(54) VEHICLE SEAT

(71) Applicant: TS TECH CO., LTD., Asaka-shi, Saitama (JP)

(72) Inventor: Masaya Furuta, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 213 days.

(21) Appl. No.: 14/387,438

(22) PCT Filed: Mar. 21, 2013

(86) PCT No.: PCT/JP2013/058131
§ 371 (c)(1),
(2) Date: Dec. 17, 2014

(87) PCT Pub. No.: WO2013/146547
PCT Pub. Date: Oct. 3, 2013

(65) Prior Publication Data
US 2015/0151653 A1 Jun. 4, 2015

(30) Foreign Application Priority Data

Mar. 27, 2012 (JP) ................................ 2012-072472

(51) Int. Cl.
*B60N 2/16* (2006.01)
*B60N 2/22* (2006.01)
(Continued)

(52) U.S. Cl.
CPC .......... *B60N 2/1615* (2013.01); *B60N 2/165* (2013.01); *B60N 2/22* (2013.01); *B60N 2/2356* (2013.01);
(Continued)

(58) Field of Classification Search
CPC .......... B60N 2/68; B60N 2/682; B60N 2/686; B60N 2/1615; B60N 2/1695
(Continued)

(56) References Cited

U.S. PATENT DOCUMENTS 4,791,765 A   12/1988   Noggle
5,100,204 A    3/1992   Makihara et al.
(Continued)

FOREIGN PATENT DOCUMENTS

EP    2 826 664 A1     1/2015
JP    60-163057 U     10/1985
(Continued)

OTHER PUBLICATIONS

Extended European Search Report issued for EP 13768705.9 (Mar. 3, 3015).

*Primary Examiner* — Timothy J Brindley
(74) *Attorney, Agent, or Firm* — Drinker Biddle & Reath LLP

(57) ABSTRACT

Provided is a vehicle seat which is capable of easily mounting a reclining mechanism mounted to a seat back frame and a resin molding part of a seat cushion frame and realizes an improved workability. A reclining mechanism arranged on the lower end side of a seat back frame and the rear end side of a seat cushion frame are coupled with a coupling member, a metal member is integrally formed on the rear end side of the seat cushion frame, an upper part of the coupling member is mounted to the reclining mechanism, and a lower part of the coupling member is welded and connected to the metal member provided on the rear end side of the seat back frame.

15 Claims, 27 Drawing Sheets

(51) Int. Cl.
 *B60N 2/68* (2006.01)
 *B60N 2/235* (2006.01)
(52) U.S. Cl.
 CPC .............. *B60N 2/68* (2013.01); *B60N 2/682* (2013.01); *B60N 2/686* (2013.01)
(58) Field of Classification Search
 USPC .................................................... 297/452.18
 See application file for complete search history.

(56) References Cited

U.S. PATENT DOCUMENTS

| | | | | |
|---|---|---|---|---|
| 2005/0168041 | A1* | 8/2005 | Glance | B60N 2/68 297/452.18 |
| 2008/0179932 | A1* | 7/2008 | Becker | B60N 2/0232 297/367 R |
| 2009/0152928 | A1* | 6/2009 | Choi | B60N 2/68 297/452.18 |
| 2010/0096895 | A1* | 4/2010 | Nonomiya | B60N 2/4228 297/344.15 |
| 2010/0187887 | A1* | 7/2010 | Yamada | B60N 2/22 297/354.12 |
| 2011/0210592 | A1* | 9/2011 | Watanabe | B60N 2/22 297/354.1 |
| 2012/0049598 | A1* | 3/2012 | Fujihara | B60N 2/1615 297/338 |
| 2012/0074743 | A1* | 3/2012 | Asakura | B60N 2/1615 297/216.1 |
| 2012/0248841 | A1* | 10/2012 | Hellrung | B60N 2/22 297/354.1 |
| 2012/0313408 | A1* | 12/2012 | Nagata | B60N 2/4235 297/216.1 |
| 2012/0313415 | A1* | 12/2012 | Nonomiya | B60N 2/68 297/354.1 |
| 2013/0187418 | A1* | 7/2013 | Watanabe | B60N 2/4221 297/216.14 |
| 2013/0187430 | A1* | 7/2013 | Watanabe | B60N 2/68 297/452.19 |
| 2015/0042133 | A1* | 2/2015 | Munemura | B60N 2/4228 297/216.14 |
| 2015/0091354 | A1* | 4/2015 | Enokijima | B60N 2/20 297/354.12 |
| 2015/0091358 | A1* | 4/2015 | Hattori | B60N 2/06 297/452.2 |
| 2015/0306985 | A1* | 10/2015 | Kimura | B60N 2/12 297/354.12 |
| 2016/0207425 | A1* | 7/2016 | Kaneko | B60N 2/68 |

FOREIGN PATENT DOCUMENTS

| | | |
|---|---|---|
| JP | 61-190251 U | 11/1986 |
| JP | 10-128831 A | 5/1998 |
| JP | 2002-034706 A | 2/2002 |
| WO | WO 03/016091 A1 | 2/2003 |
| WO | WO 2010/101874 A1 | 9/2010 |

* cited by examiner

VEHICLE SEAT

CROSS REFERENCE TO RELATED APPLICATIONS

This application is a National Stage Entry application of PCT Application No. PCT/JP2013/058131, filed Mar. 21, 2013, which claims the priority benefit of Japanese Patent Application No. 2012-072472, filed Mar. 27, 2012, the contents of all being incorporated herein by reference.

BACKGROUND

Disclosed herein is a vehicle seat, and, particularly, a vehicle seat provided with a reclining mechanism for supporting a seat back frame in a rotatable state, and a seat cushion frame having a resin molding part made of a resin material.

Among vehicle seats, in order to reduce weight, some seat back frames or seat cushion frames are molded by a resin material such as plastic, in part or in whole.

As an example of such a vehicle seat, there is a known vehicle seat which is provided with a reclining mechanism for supporting a seat back including a seat back frame in a rotatable state relative to a seat cushion and in which, for example, a seat cushion frame coupled to the reclining mechanism is molded by a resin material.

As such a configuration example, for example, there is proposed a vehicle seat in which the whole seat cushion frame is molded as an integral member by a composite material consisting of a thermoplastic matrix and reinforcing fibers, or the like.

As thus described, in the seat cushion frame reduced in weight, generally, fastening and fixing by a fastening member such as a bolt is typical for mounting peripheral members (refer to Japanese Patent Document No. 2002-034706 A ("the '706 Document")).

A vehicle seat described in the '706 Document is provided with a cushion frame which may be formed of a reinforced resin to reduce weight as disclosed therein.

In frame sides constituting the vehicle seat, bolt holes are formed, and in the bolt holes, hinge brackets of a reclining device are assembled by bolting, respectively.

In this way, the reclining device is mounted to the cushion frame by bolting (of the hinge brackets).

However, as with the vehicle seat described in the '706 Document, if bolting is performed when mounting other components (for example, a reclining mechanism) to the cushion frame, there is a problem that many working processes are required and workability is poor.

Accordingly, in manufacturing vehicle seats, it has been strongly demanded to improve workability in the other components mounting process by mounting a reclining mechanism to a resin molding part molded by a resin material in a seat cushion frame more easily.

In addition, along with this, a technique in which the number of components is reduced and which is advantageous also in cost has been demanded.

Further, in order to reduce weight of frame, in constituting the seat cushion frame by a resin, it is necessary to secure the rigidity of the reclining mechanism and its mounting point (the mounting point in the seat cushion frame), that is, the mounting rigidity of the reclining mechanism to the seat cushion frame and the rigidity of the peripheral part mounting point while making the mounting of the reclining mechanism easier.

SUMMARY

An object of various embodiments disclosed herein is to provide a vehicle seat which, in the manufacturing process, is capable of easily mounting a reclining mechanism mounted to a seat back frame and a resin molding part of a seat cushion frame and realizes an improved workability.

In addition, other object is to provide a vehicle seat in which the mounting rigidity of the reclining mechanism and the periphery of the seat cushion frame is secured while making the coupling of the reclining mechanism and the seat cushion frame easier.

In addition, other object is to provide a vehicle seat in which an increase of the number of components is suppressed while separately using a component for mounting the reclining mechanism.

Accordingly, the above problems are solved by a vehicle seat having a seat back frame on which a reclining mechanism is arranged on a lower part thereof, and a seat cushion frame made of a resin material at least partly, in which the reclining mechanism arranged on a lower end side of the seat back frame and a rear end side of the seat cushion frame are coupled with a metallic coupling member, a metal member is integrally formed on the rear end side of the seat cushion frame, an upper part of the coupling member is mounted to the reclining mechanism, and a lower part of the coupling member is welded and connected to the metal member provided on the rear end side of the seat back frame.

As thus configured, the reclining mechanism mounted to the seat back frame and the seat cushion frame can be coupled by a welding connection via the coupling member.

In other words, this design is configured so that the metallic coupling member and the metal member integrally formed on the rear end side of the seat cushion frame can be welded and connected.

Therefore, for example, it is unnecessary to perform the fixing by bolting, and it is possible to reduce working processes. Then, along with this, mounting workability is improved.

In addition, the welding connection is performed by using the coupling member, so that it is unnecessary to use fastening members (for example, bolts or the like) other than the coupling member and consequently the number of components can be reduced.

If the reclining mechanism also is connected to the seat back frame by welding, differently from the case where the reclining mechanism is over-molded when molding a resin molding part of the seat back frame, the structure in which the reclining mechanism is mounted to the resin molding part is not complicated, mounting of the reclining mechanism can be easily performed, and further workability is improved.

In addition, in the above vehicle seat, preferably, the metal member is arranged on at least a part of an outside surface of a rear end of the seat cushion frame and on at least a part of an upper side surface extending while bending inward from an upper part of the outside surface, and the coupling member is welded and connected at a covering portion in a state that the metal member portion arranged on the outside surface and the upper side surface of the rear end of the seat cushion frame is covered.

As thus configured, on the outside surface and the upper side surface of the seat cushion frame, the coupling member and the metal member are coupled at the portion where they are layered, so that the mounting rigidity of the coupling member is improved.

In addition, in the above vehicle seat, preferably, the seat cushion frame is provided with a height adjustment mechanism mounting part to which a height adjustment mechanism for displacing a height of the seat cushion frame with respect to a vehicle floor is mounted, and the coupling member extends to a position aligned with at least a part of the height adjustment mechanism mounting part in an up and down direction in a state that the coupling member is welded to the rear end side of the seat cushion frame.

As thus configured, the rigidity in the vicinity of the height adjustment mechanism mounting part is improved.

In addition, specifically in the above configuration, preferably, the height adjustment mechanism is configured as a link mechanism, the height adjustment mechanism mounting part is provided as a hole part in which a link central axis or a link driving member is arranged, and the metal member extends to a position where the height adjustment mechanism mounting part is provided.

As thus configured, the rigidity of the hole part is improved, and the mounting rigidity of the link or the mounting rigidity of the link driving member (for example, a brake mechanism or the like) is improved.

In addition, in the above vehicle seat, preferably, the coupling member is configured by being curved in such a manner that a mounting point thereof to the seat cushion frame extends toward a front upper side of the seat cushion frame in a state that the coupling member is welded to the rear end side of the seat cushion frame, and the metal member is configured to be arranged by being curved to align with a shape of the mounting point of the coupling member to the seat cushion frame.

As thus configured, the welding area can be secured large compared to the case where welding point is linearly formed, so that the mounting rigidity of the coupling member is improved.

In addition, in the above vehicle seat, the seat cushion frame is provided with a height adjustment mechanism mounting part to which a height adjustment mechanism for displacing a height of the seat cushion frame with respect to a vehicle floor is mounted, and the metal member extends to a position aligned with at least a part of the height adjustment mechanism mounting part in an up and down direction.

As thus configured, the rigidity in the vicinity of the height adjustment mechanism mounting part is improved.

In addition, in the above vehicle seat, preferably, the coupling member and the reclining mechanism are welded and connected, an upper part of the coupling member is formed to align with a shape of the reclining mechanism, and the welded portion between the coupling member and the reclining mechanism is configured to align with the shape of the reclining mechanism.

As thus configured, the distance between the welded portion and the reclining mechanism can be secured in the coupling member so that the rigidity of the coupling member is improved.

In addition, the mounting rigidity of the coupling member is improved as well.

In addition, in the above vehicle seat, preferably, the reclining mechanism is mounted to the upper part of the coupling member, the seat cushion frame is welded and connected to the lower part of the coupling member, and the lower part of the coupling member is configured larger than the upper part thereof.

As thus configured, the welding area can be secured large so that the mounting rigidity is improved.

Further, in the above vehicle seat, preferably, the seat cushion frame is provided with a height adjustment mechanism mounting part to which a height adjustment mechanism for displacing a height of the seat cushion frame with respect to a vehicle floor is mounted, the height adjustment mechanism is configured as a link mechanism, and the height adjustment mechanism mounting part is provided as a hole part in which a link central axis or a link driving member is arranged, and it is preferable that the lower part of the coupling member is curved to escape to a rear side with respect to the height adjustment mechanism mounting part when mounted to the rear end side of the seat cushion frame because the inhibition of assembling work of the height adjustment mechanism can be effectively prevented.

Furthermore, in the above vehicle seat, preferably, the seat cushion frame is provided with a height adjustment mechanism mounting part to which a height adjustment mechanism for displacing a height of the seat cushion frame with respect to a vehicle floor is mounted, the height adjustment mechanism is configured as a link mechanism, and the height adjustment mechanism mounting part is formed as a hole part in which a link central axis or a link driving member is arranged, and it is preferable that the metal member provided on the rear end side of the seat back frame extends to a position surrounding the height adjustment mechanism mounting part because the rigidity of the height adjustment mechanism mounting part (the peripheral part of the hole part) is improved.

Furthermore, in the above vehicle seat, preferably, the seat cushion frame is provided with a height adjustment mechanism configured as a link mechanism for displacing the height of the seat cushion frame with respect to a vehicle floor, a height adjustment mechanism is provided with a brake pinion mechanism for restricting an action of the link mechanism, and the seat cushion frame is provided with a brake member arrangement hole in which the brake pinion mechanism is arranged, and it is preferable that the metal member provided on the rear end side of the seat back frame extends to a position surrounding the brake member arrangement hole because the rigidity in the periphery of the mounting part for the brake pinion mechanism is improved.

Furthermore, in the above vehicle seat, preferably, the metal member is arranged on at least a part of an outside surface of a rear end of the seat cushion frame and on at least a part of an upper side surface extending and bending inward from an upper part of the outside surface, at least a part of the metal member is formed as a convex part protruding outward, at least a part of the convex part is exposed outward, and the coupling member is welded and connected to an outward exposed portion of the convex part in a state that the metal member portion arranged on the outside surface and the upper side surface of the rear end of the seat cushion frame is covered.

As thus configured, the (welding) mounting rigidity is improved, and the rigidity in the periphery of the welded part is also improved.

Furthermore, in the above vehicle seat, preferably, the metal member is configured as an iron pin having a head and a leg, the iron pin is fixed to the seat back frame in such a manner that the head is arranged inward and a free end side of the leg is arranged outward, the coupling member is provided with a coupling member-side iron pin through-hole through which the leg passes, and the coupling member is mounted to the seat cushion frame by a welding connection in a contact part of the leg and the coupling member-side iron pin through-hole in a state that the metal member portion arranged on an outside surface and an upper side surface of a rear end of the seat cushion frame is covered and the leg is inserted through the coupling member-side iron pin through-hole.

As thus configured, the welding mounting rigidity is improved, the rigidity in the periphery of the welded part is also improved, and, in addition to this, the connection of the seat cushion frame and the coupling member is facilitated.

Furthermore, in the above vehicle seat, preferably, the metal member is arranged on at least a part of the outside surface of a rear end of the seat cushion frame and on at least a part of an upper side surface extending and bending inward from an upper part of the outside surface and extends from a back toward a front of the outside surface while avoiding an upper edge part and a lower edge part of the outside surface, and the coupling member is welded and connected at a covering portion in a state that the metal member portion arranged on the outside surface and the upper side surface of the rear end of the seat cushion frame is covered.

As thus configured, the coupling member and the metal member are coupled at the portion where these members are layered on the outside surface and the upper side surface so that the mounting rigidity of the coupling member is improved, and the rigidity is improved because the line from the back toward the front of the outside surface of the cushion frame is reinforced.

Then, if the mounting parts (for example, mounting holes or the like) for components or the like are formed in the portion extending from the back toward the front, that portion is strengthened and the rigidity is improved.

According to the vehicle seat of an embodiment, when coupling the reclining mechanism mounted to the seat back frame and the seat cushion frame, for example, it is unnecessary to perform the bolting or the like, and it is possible to reduce working processes. Then, along with this, the mounting workability is improved.

In other words, the reclining mechanism mounted to the seat back frame and the seat cushion frame can be easily coupled.

In addition, the welding connection is performed by using the coupling member, so that it is unnecessary to use fastening members (for example, bolts or the like) other than the coupling member and consequently the number of components can be reduced.

According to the vehicle seat of an embodiment, on the outside surface and the upper side surface of the seat cushion frame, the coupling is performed at the portion where they are layered so that the mounting rigidity of the coupling member is improved.

According to the vehicle seat of an embodiment, the rigidity in the vicinity of the height adjustment mechanism mounting part is improved.

According to the vehicle seat of an embodiment, the mounting rigidity of the link or the mounting rigidity of the link driving member (for example, a brake mechanism or the like) is improved.

According to the vehicle seat of an embodiment, the welding area can be secured large compared to the case where welding point is linearly formed, so that the mounting rigidity of the coupling member is improved.

According to the vehicle seat of an embodiment, the rigidity in the vicinity of the height adjustment mechanism mounting part is improved.

According to the vehicle seat of an embodiment, the distance between the welded portion and the reclining mechanism can be secured so that both the rigidity of the coupling member and the mounting rigidity of the coupling member are improved.

According to the vehicle seat of an embodiment, the welding area can be secured large, so that the mounting rigidity is improved.

According to the vehicle seat of an embodiment, the inhibition of assembling work of the height adjustment mechanism can be effectively prevented.

According to the vehicle seat of an embodiment, the rigidity of the height adjustment mechanism mounting part (the peripheral part of the hole part) is improved.

According to the vehicle seat of an embodiment, the rigidity in the periphery of the mounting part for the brake pinion mechanism is improved.

According to the vehicle seat of an embodiment, the welding mounting rigidity is improved, and the rigidity in the periphery of the welded part is also improved.

According to the vehicle seat of an embodiment, the welding mounting rigidity is improved, the rigidity in the periphery of the welded part is also improved, and in addition to this, the connection of the seat cushion frame and the coupling member is facilitated.

According to the vehicle seat of an embodiment, the mounting rigidity of the coupling member is improved, and the rigidity of the side surface portion of the seat cushion frame is improved.

DETAILED DESCRIPTION

Hereinafter, a vehicle seat according to one embodiment (hereinafter, referred to as the present embodiment) of the present invention will be described with reference to the drawings. The embodiment described below is merely an example to facilitate understanding of the present invention, and the present invention is not limited thereto. That is, the shape, dimension, arrangement and the like of the members described below can be changed and improved without departing from the gist of the present invention, and as a matter of course, the present invention includes equivalents thereof.

In addition, in the following description, the front to back direction is a direction corresponding to a traveling direction of a vehicle, the width direction is a direction along the lateral width of the vehicle and corresponds to the width direction of the vehicle seat of the present invention, and the up and down direction is the up and down direction of the vehicle.

FIGS. 1 to 21 show one embodiment of the present invention, and the embodiment of the present invention will be described below with reference to these figures.

In addition, FIGS. 22 to 26 show a first modification example to a fifth modification example respectively, and the respective modification examples will be described with reference to these figures after describing the embodiment.

In the cross-sectional explanatory views of FIGS. 12, 14, 16, and 19, in order to simplify the illustration, an internal structure of a reclining mechanism is omitted, and a case of the reclining mechanism also is illustrated in a slightly simplified manner.

Figure 1:
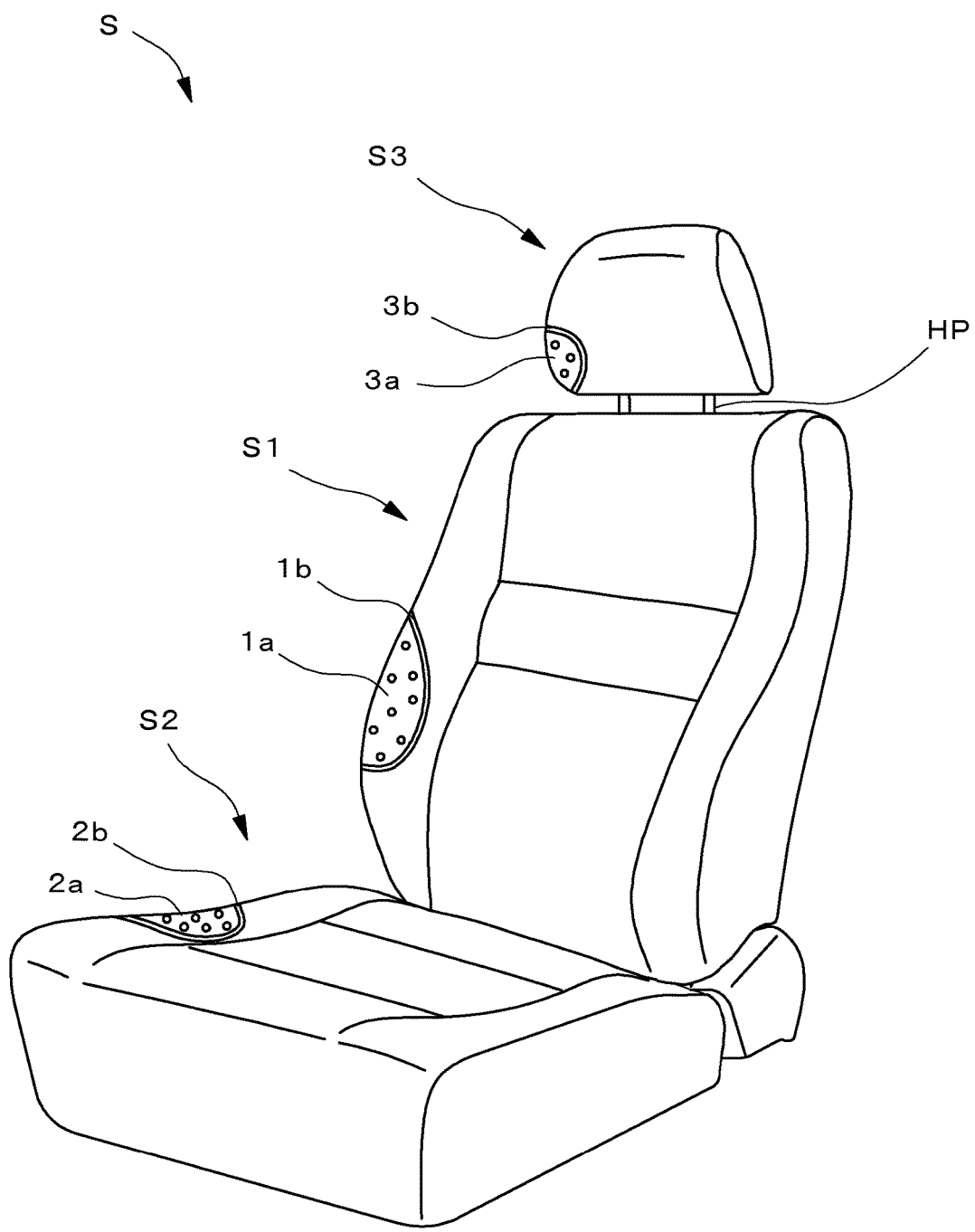
FIG. 1 is a schematic perspective view of a vehicle seat according to one embodiment of the present invention.

As shown in FIG. 1, a vehicle seat S according to the present embodiment is configured by a seat back S1, a seat cushion S2, and a headrest S3, and the seat back S1 and the seat cushion S2 are respectively configured by disposing cushion pads 1a, 2a on frames 1, 2 and covering them with skin materials 1b, 2b.

The headrest S3 is configured by disposing a cushion pad 3a on a core material (not shown) and covering them with a skin material 3b, and supported by a headrest pillar HP mounted to the seat back frame 1.

Figure 2:
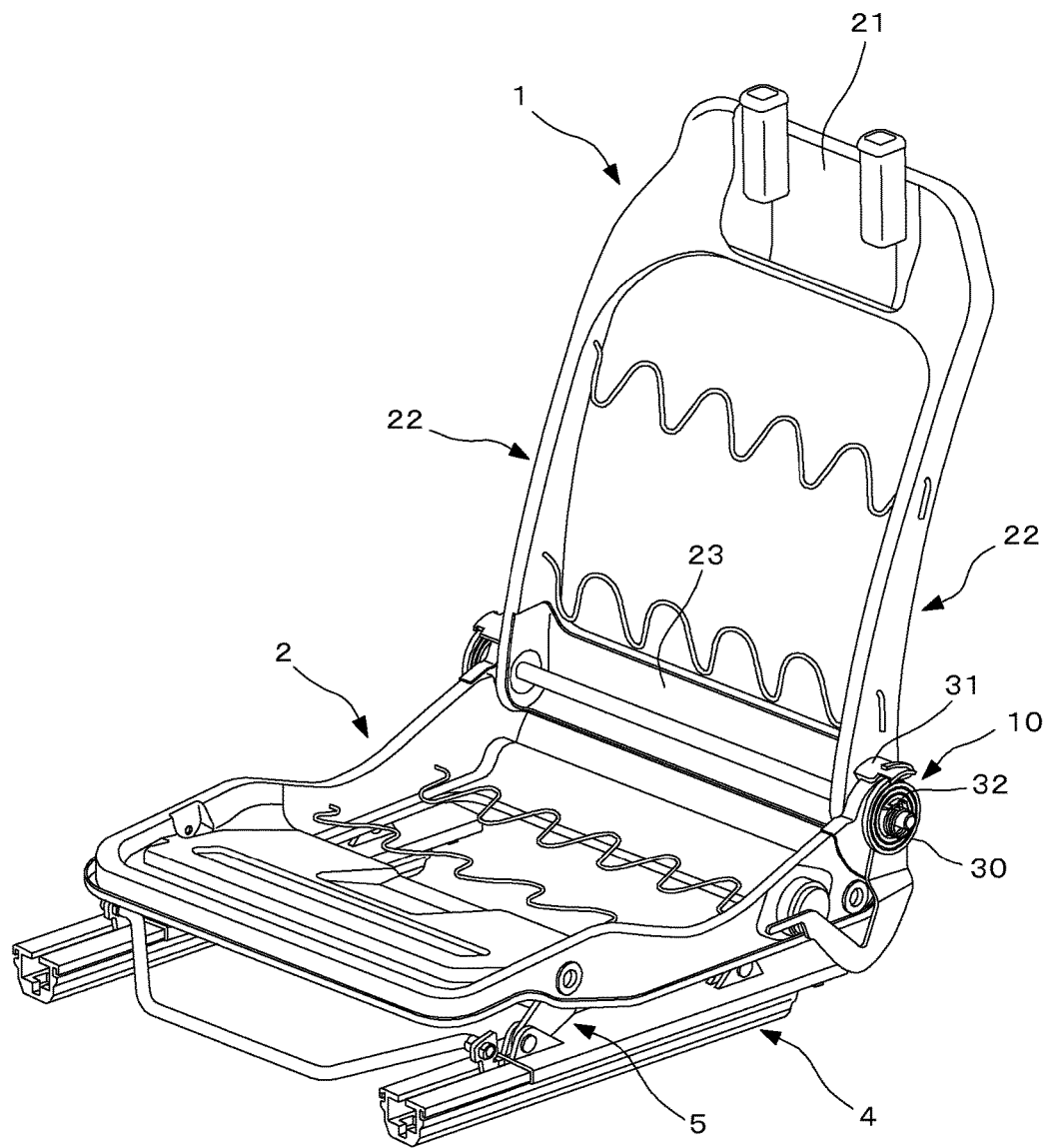
FIG. 2 is a schematic perspective view showing a frame of the vehicle seat according to the embodiment of the present invention.
Figure 3:
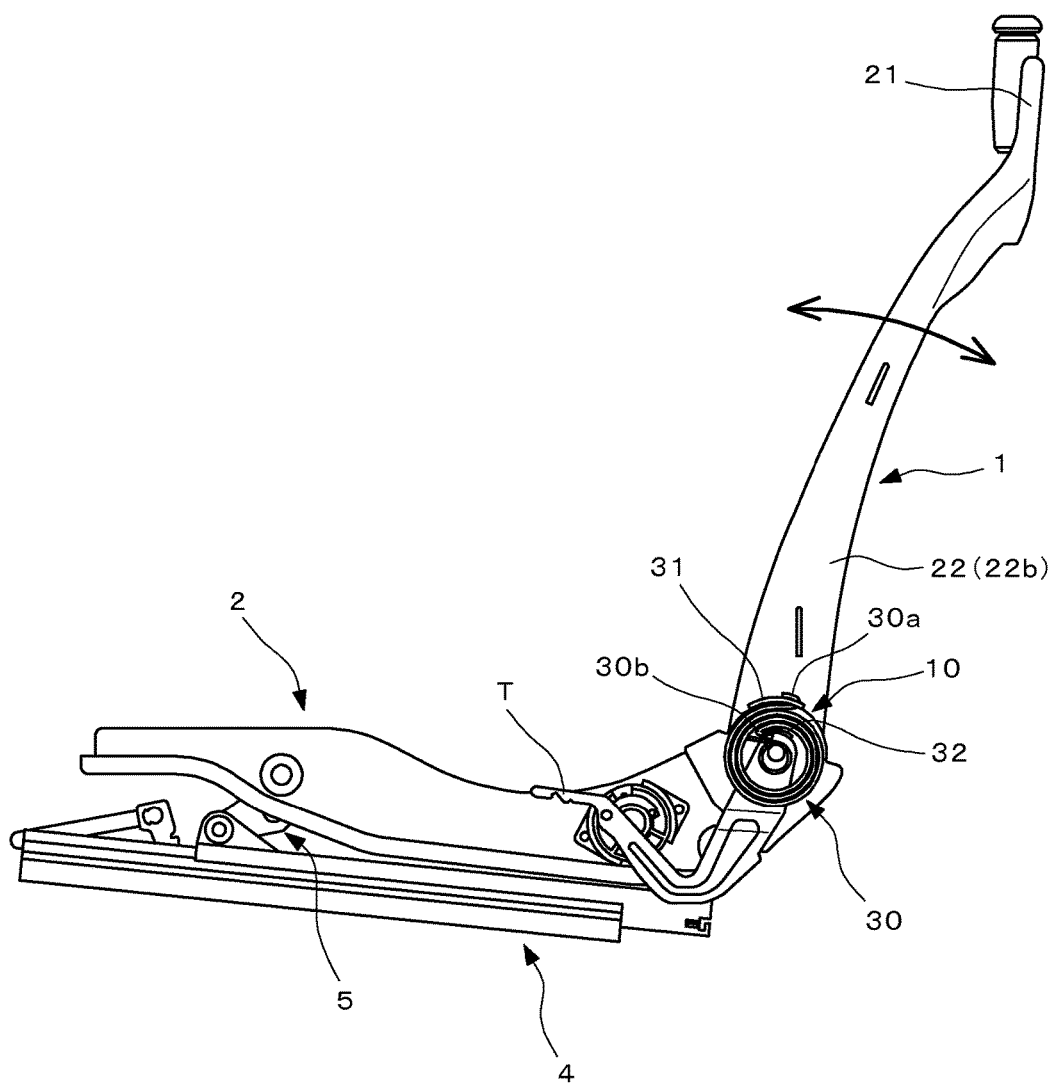
FIG. 3 is a schematic side view showing the frame of the vehicle seat according to the embodiment of the present invention.

As shown in FIGS. 2 and 3, the frame of the vehicle seat S according to the present embodiment has the seat back frame 1 constituting the seat back S1 and the seat cushion frame 2 constituting the seat cushion S2, as main constituent elements.

The seat cushion frame 2 is of a substantially square shape in plan view, and mounted to the vehicle floor via a slide rail mechanism 4 for slidably moving the vehicle seat S in the front to back direction and a height adjustment mechanism 5 for moving the vehicle seat S in the up and down direction The seat back frame 1 is of a substantially square shape in plan view, and integrally formed by a carbon fiber reinforced plastic (CFRP) as a resin material in the present embodiment.

The seat back frame 1 is supported by coupling a lower end thereof to a rear end of the seat cushion frame 2 via a reclining mechanism 10 and a coupling bracket 9 mounted thereto.

In such a state, the seat back frame 1 can be rotated in the direction shown by an arrow in FIG. 3 relative to the seat cushion frame 2.

The periphery of the coupling portion of the seat cushion frame 2 and the seat back frame 1 will be described in detail later because that portion is a main configuration including the configuration of the reclining mechanism 10 and the coupling bracket 9.

The reclining mechanism 10 is mounted to a predetermined position of the seat back frame 1 for supporting the seat back frame 1 in a rotatable state. The reclining mechanism 10 has a reclining mechanism main body 11 that drives when rotating the seat back frame 1, and a case 12 housing the reclining mechanism main body 11, as main constituent elements.

Figure 4:
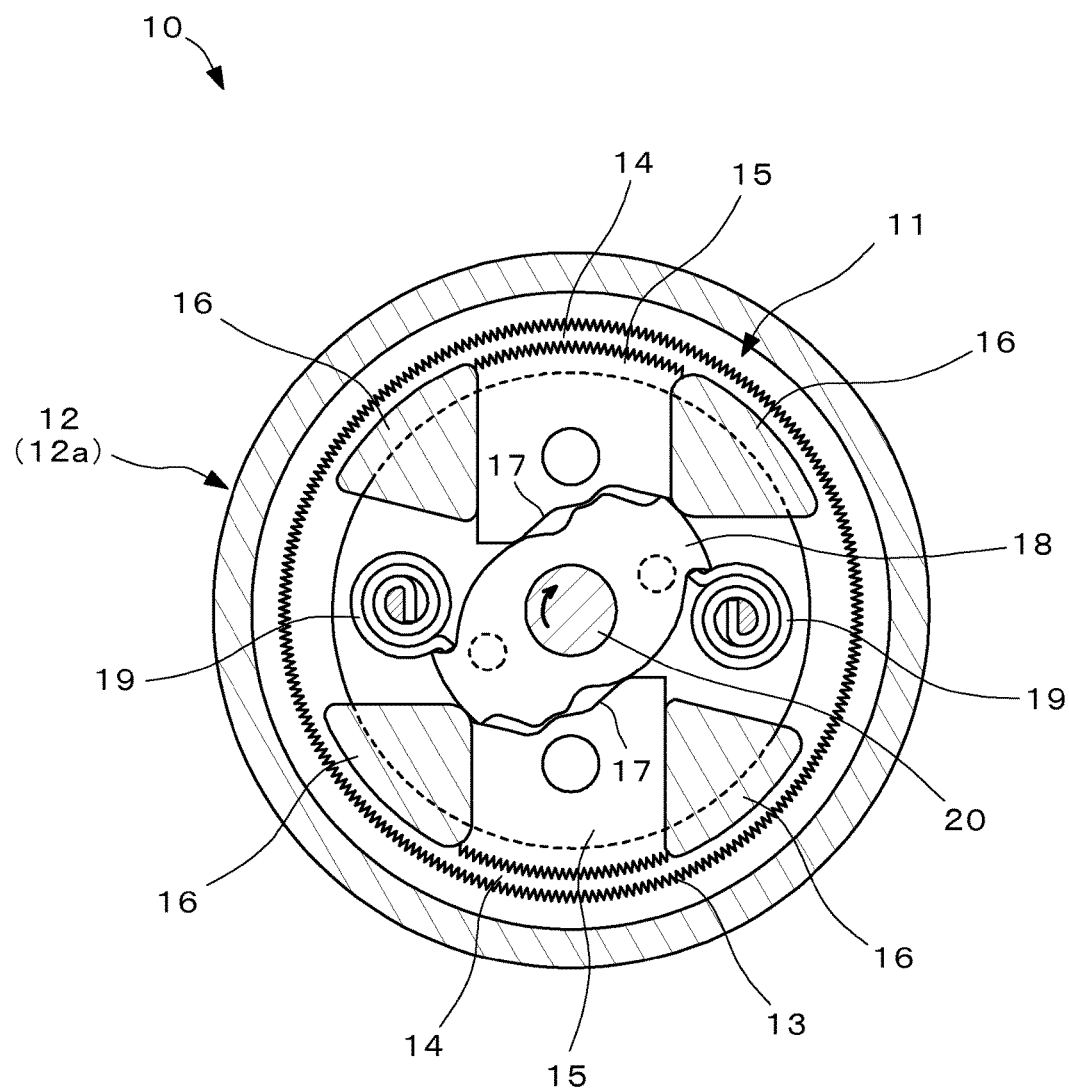
FIG. 4 is a schematic side view showing an internal structure of a reclining mechanism according to the embodiment of the present invention.

As to the reclining mechanism main body 11, a known configuration for rotatably supporting the seat back frame 1 is adopted. As an example, a sliding lock member 15 is provided as shown in FIG. 4, and a lock gear part 14 mounted to the sliding lock member 15 is engaged with and disengaged from an engaging gear 13 by the moving action of the sliding lock member 15.

By such a reclining mechanism main body 11, it is possible to switch the state of the seat back frame 1 between a locked state in which it is fixed to the seat cushion frame 2 and an unlocked state in which it can be rotated relative to the seat cushion frame 2.

Figure 7:
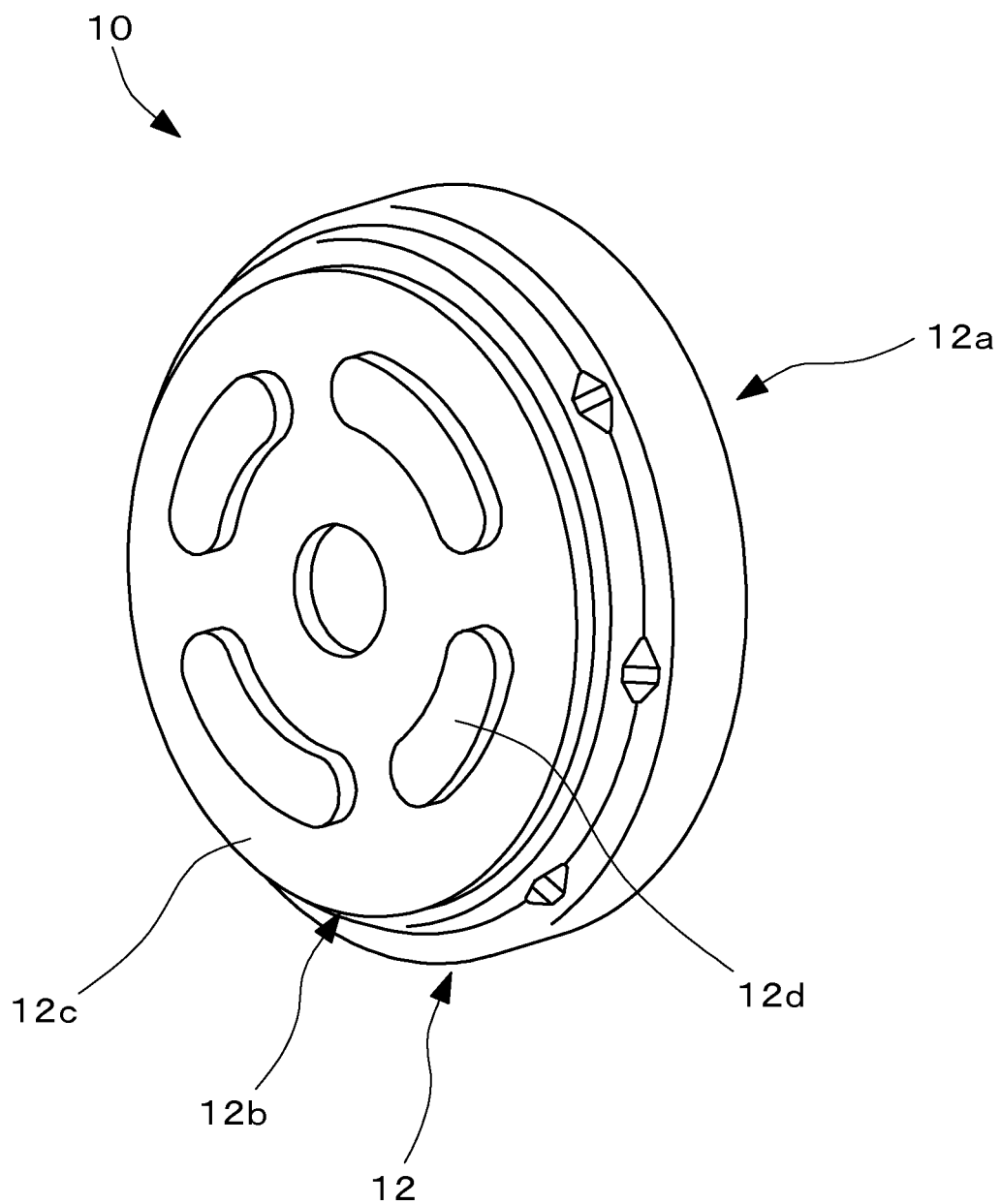
FIG. 7 is a schematic perspective view showing the reclining mechanism according to the embodiment of the present invention.

Specifically, in the present embodiment, the case 12 housing the reclining mechanism main body 11 is of a substantially cylindrical outer shape, and configured by combining an outer case piece 12a and an inner case piece 12b shown in FIG. 7, for example.

The outer case piece 12a and the inner case piece 12b are both made of metal. The outer case piece 12a is connected to the seat cushion frame 2 side, the aforementioned engaging gear 13 is formed on an inner peripheral face thereof, and the aforementioned sliding lock member 15 is provided further on the inside thereof.

On the other hand, the inner case piece 12b is connected to the seat back frame 1 side, and a pair of path regulating parts 16, 16 regulating a moving path of the sliding lock member 15 are disposed on the inside thereof in a state that the sliding lock member 15 is sandwiched therebetween.

In addition, the sliding lock member 15 is formed with a cam surface 17, and a cam body 18 abutting on the cam surface 17 is mounted in a fixed state to a rotary shaft 20 passing through the inner case piece 12b and entering the case.

In the reclining mechanism 10 thus configured, in a normal time, the sliding lock member 15 is disposed in a position where the lock gear part 14 and the engaging gear 13 are engaged with each other, and the state of the seat back frame 1 is in the locked state.

In such a state, when an operating lever T (see FIG. 3) is operated, the rotary shaft 20 is rotated by the operation, and in conjunction with this, the cam body 18 is rotated. The cam body 18 in a rotating state abuts on the cam surface 17, and thereby the sliding lock member 15 moves in a direction away from the engaging gear 13 between the path regulating parts 16, 16.

As a result, the lock gear part 14 is disengaged from the engaging gear 13, and the state of the seat back frame 1 is in the unlocked state.

Then, while the state of the seat back frame 1 is in the unlocked state, an occupant can tilt the seat back S1 backward. If the operating lever T is released at the time when the backward-tilt angle reaches a desired angle, the cam body 18 returns by a spring body 19 to the original position, namely, the position at locking, and the sliding lock member 15 moves between the path regulating parts 16, 16 toward the engaging gear 13.

As a result, when the operation of the operating lever T ends, the lock gear part 14 engages again to the engaging gear 13, and the state of the seat back frame 1 returns to the locked state.

Although the coupling bracket 9 is welded or adhered to the reclining mechanism 10 and the reclining mechanism 10 is coupled to the seat cushion frame 2 via the coupling bracket 9, this configuration will be described in detail later.

Figure 5:
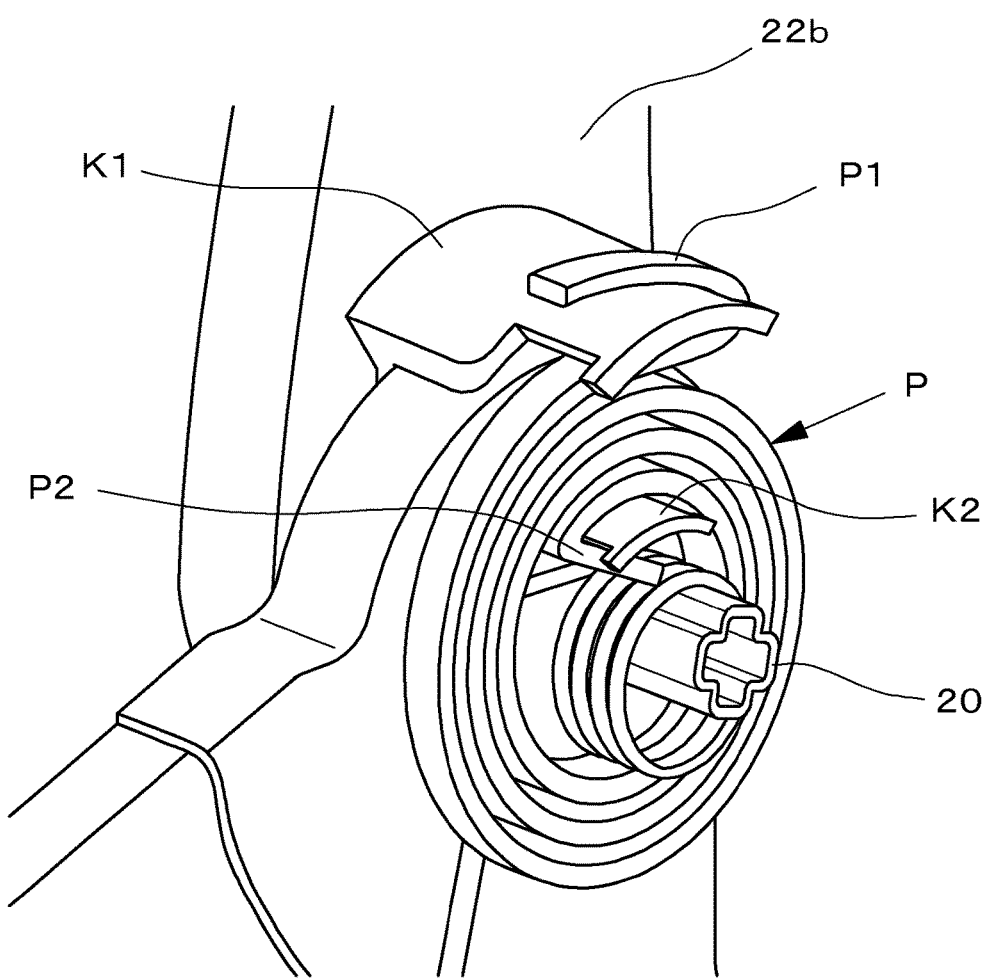
FIG. 5 is an enlarged perspective view of the periphery of the reclining mechanism of FIG. 2.
Figure 6:
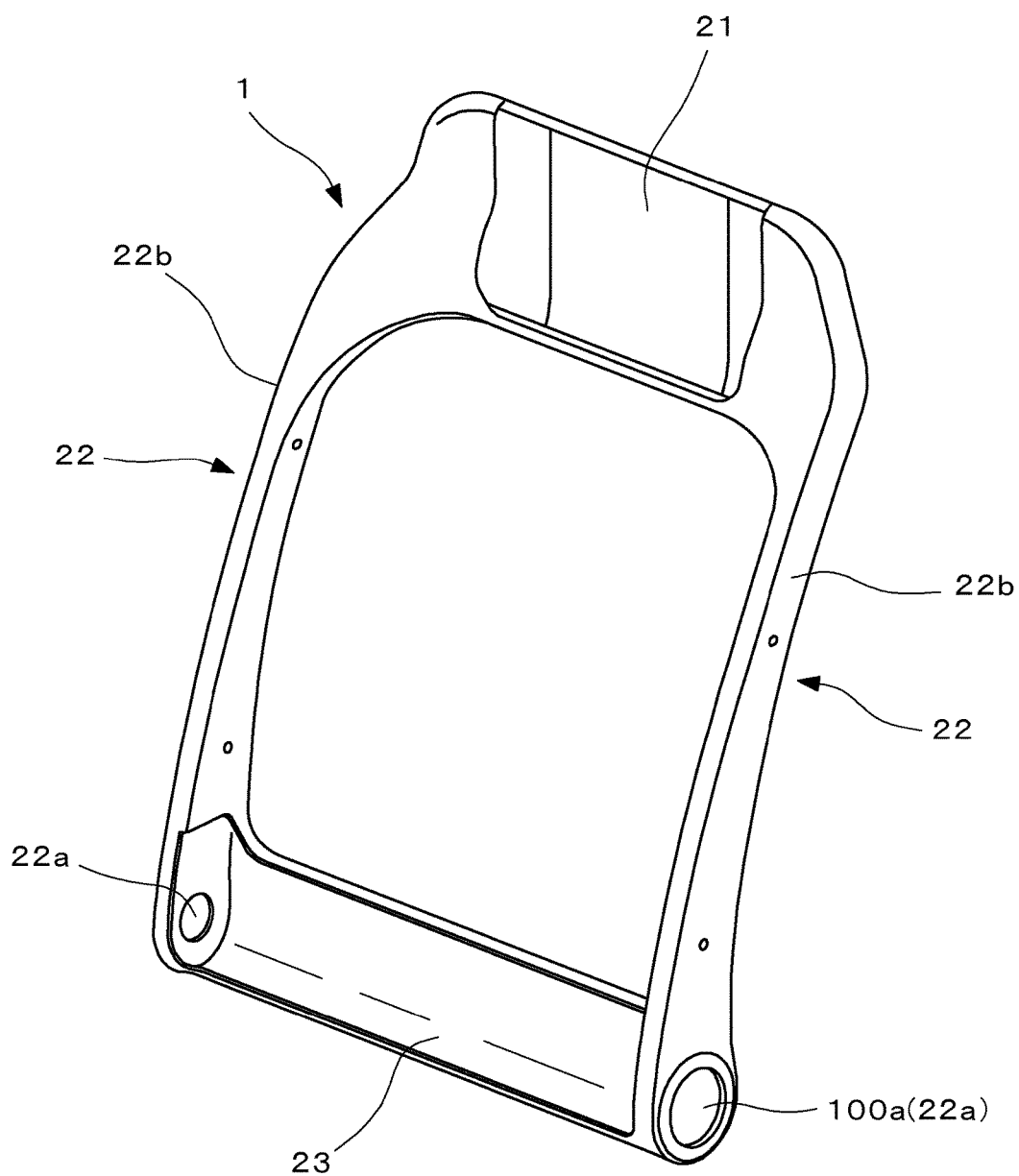
FIG. 6 is a schematic perspective view showing an example of the shape of a seat back frame according to the embodiment of the present invention.

And now, as shown in FIG. 5, a spiral spring P as an elastic member is hung on the lower end of the seat back frame 1 connected to the reclining mechanism 10 and the rear end of the seat cushion frame 2.

The spiral spring P biases the seat back frame 1 to be rotated forwardly when the state of the seat back frame 1 is in the unlocked state and the seat back S1 is in the backward-tilting state, and one end P1 thereof is locked to a locking part K1 provided on the seat back frame 1 side.

Here, the locking part K1 is formed by a sheet metal member fixed to a side frame 22 of the seat back frame 1, for example, and is locked by hooking the one end P1 of the spiral spring P to the bent portion thereof to extend outward in the width direction.

The other end P2 of the spiral spring P is locked to a locking part K2 provided on the seat cushion frame 2 side, and the locking part K2 also has a portion extending outward in the width direction, and locks the other end P2 of the spiral spring P by hooking the other end P2 of the spiral spring P to that portion.

Next, the configuration of the above-mentioned seat back frame 1 will be described in greater detail.

As previously described, the seat back frame 1 is made of CFRP, and integrally molded by way of metal molding in the present embodiment. However, it is not limited thereto, and the seat back frame 1 may be molded by a resin material other than CFRP. Alternatively, the seat back frame 1 may be configured by way of a molding method other than metal molding, for example, by layering sheets made of a resin material to be fitted to the shape of frame.

As to the shape of the seat back frame 1, it is a substantially square outer shape in plan view, as previously described. Specifically, the seat back frame 1 has an upper frame 21 extending along the width direction, a pair of side frames 22, 22 extending downwardly from both ends of the width direction of the upper frame 21, and a lower frame 23 coupling the lower ends of the side frames 22.

The upper frame 21 is formed slightly wider in the up and down direction, and in the present embodiment, the cross section whose normal direction is the width direction has a closed cross section structure, that is, the cross-sectional shape is a hollow rectangular shape.

Each of the pair of side frames 22, 22 is widened asymptotically from the upper part toward the lower part, and the lower end thereof has a semicircular shape when viewed from the width direction.

In addition, as to each side frame 22, the cross-sectional shape whose normal direction is the up and down direction has a closed cross section structure to a halfway position in the up and down direction.

On the other hand, as to the lower end of each side frame 22, its cross-sectional shape is not a closed cross-sectional shape, and an inner portion in the width direction is formed in an opening shape.

This is caused by extracting the seat back frame 1 which is a molded product from the mold in the metal molding process.

However, each side frame 22 is not limited to the above shape, may have a closed cross section structure to the lower end. In contrast, in each side frame 22, the cross section structure may not be a closed cross section structure from the upper end to the lower end.

In addition, a reclining mechanism arrangement hole 22a is formed in the lower end of each side frame 22, a circular ring shaped mounting bracket 10a is mounted to that portion, and the reclining mechanism 10 is arranged thereto via the mounting bracket 10a.

The rotary shaft 20 is configured to protrude from a shaft hole formed in the reclining mechanism 10. Then, the rotary shaft 20 is disposed between the side frames 22, 22 in a state that the axial direction is along the width direction, and the end of the rotary shaft 20 protrudes outward in the width direction from an outside surface 22b of the side frame 22 through the shaft hole.

Then, the operating lever T is mounted to a position further out than the reclining mechanism 10.

As to the number of the reclining mechanisms 10, two reclining mechanisms 10 may be provided to be disposed at both sides in the width direction of the vehicle seat S, or one reclining mechanism 10 may be provided to be disposed at one side in the width direction of the vehicle seat S.

The lower frame 23 is provided to wrap around a front face from the rear end of the lower end of each side frame 22, and has a substantially J-shape in side view.

In the seat back frame 1 thus configured, the aforementioned reclining mechanism 10 is mounted to the side frame 22.

In other words, the reclining mechanism 10 is mounted to the outside surface 22b facing the outside in the width direction, more specifically, to the lower end in which the reclining mechanism arrangement hole 22a is formed, of the side surface of the side frame 22.

In the present embodiment, the whole seat back frame 1 including the side frame 22 is molded by CFRP as a resin material but is not limited thereto, and of the seat back frame 1, at least a portion to which the reclining mechanism 10 is mounted may be made of a resin material.

In addition, in the present embodiment, the seat back frame 1 is integrally molded by metal molding but is not limited thereto, and the seat back frame 1 may be configured by separately molding a front portion (a front shell) and a rear portion (a rear shell) of the seat back frame 1 and thereafter combining the both shells.

Figure 8:
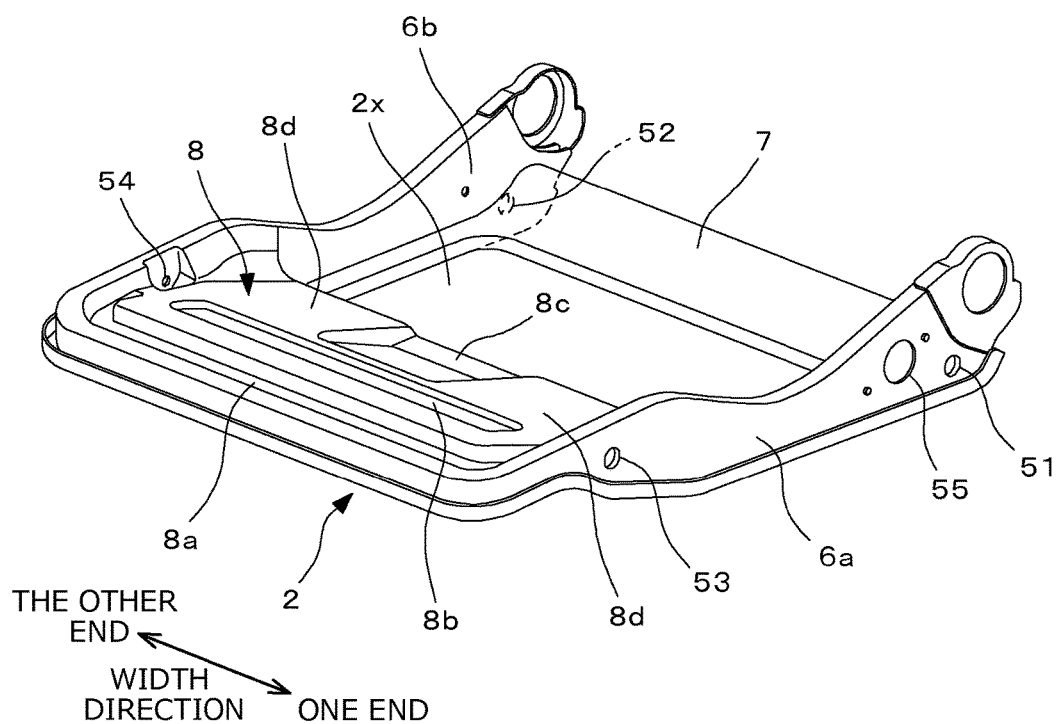
FIG. 8 is a typical perspective view of a seat cushion frame according to the embodiment of the present invention.

More specifically, as shown in FIG. 8, the aforementioned seat cushion frame 2 is provided with a pair of side part frames 6a, 6b located on both ends of the width direction of the seat cushion frame 2, a rear end side coupling part 7 coupling the rear ends of the side part frames 6a, 6b, and a front end side coupling part 8 coupling the front ends of the side part frames 6a, 6b.

The respective parts of the seat cushion frame 2 described above are integrally molded by CFRP, as previously described.

In the present embodiment, the whole seat cushion frame 2 including the side part frames 6a, 6b is molded by CFRP as a resin material but is not limited thereto, and of the seat cushion frame 2, at least the side part frames 6a, 6b may be made of a resin material, or of the side part frames 6a, 6b, at least a portion to which the coupling bracket 9 is mounted may be made of a resin material in part.

In addition, the seat cushion frame 2 according to the present embodiment is manufactured by metal molding but is not limited thereto, and the seat cushion frame 2 may be molded by a molding method other than metal molding, for example, by layering sheets made of a resin material to be fitted to the shape of frame. In addition, the material of the seat cushion frame 2 is not limited to CFRP, and may be other resin materials.

Further, in the present embodiment, although the whole seat cushion frame 2 is molded by CFRP as a resin material, an iron plate piece I2 is insert-molded in the rear end of the side part frames 6a, 6b.

In other words, in the present embodiment, in the coupling portion with the coupling bracket 9, the iron plate piece I2 is insert-molded in CFRP.

This is effective for facilitating the laser welding of the coupling bracket 9 configured as a metal member, and for enhancing the rigidity of that area.

The details of the area where the iron plate piece I2 is inserted or the like will be described in detail later because that area is a main configuration.

Each of the pair of the side part frames 6a, 6b is elongated along the front to back direction of the vehicle seat S, and the seat back frame 1, more specifically, the side frame 22 of the seat back frame 1 is mounted to the inside of the rear end of the side part frames 6a, 6b via the reclining mechanism 10.

In addition, of the rear end of the side part frames 6a, 6b, to the portion located below the portion to which the side frame 22 is mounted, a rear side link 30 described later is assembled.

Specifically, link assembling holes 51, 52 formed for assembling the rear side link 30 are formed in the rear ends of the side part frames 6a, 6b, respectively.

Further, a front side link 40 described later is assembled to the front ends of the side part frames 6a, 6b. Specifically, link assembling holes 53, 54 formed for assembling the front side link 40 are formed in the front ends of the side part frames 6a, 6b, respectively.

"The height adjustment mechanism mounting part formed as a hole part in which a link central axis is arranged" refers to the link assembling hole 51 for example.

In addition, in the following description, among the pair of side part frames 6a, 6b, the side part frame 6a located on one end of the width direction of the seat cushion frame 2 is referred to as the one end frame 6a, and the side part frame 6b located on the other end of the width direction of the seat cushion frame 2 in a state facing the one end frame 6a is referred to as the other end frame 6b.

The rear end side coupling part 7 is molded slightly wider along the front to back direction, and particularly in the present embodiment, at the respective rear ends of the one end frame 6a and the other end frame 6b, the rear end side coupling part 7 is provided ahead of the portion to which the seat back frame 1 is mounted.

In addition, in the present embodiment, the rear end of the rear end side coupling part 7 extends toward the seat back frame 1 in a state assembled to the respective rear ends of the one end frame 6a and the other end frame 6b.

More clearly, as shown in FIG. 2, the portion to which the seat back frame 1 is mounted is located in the uppermost part of the respective rear ends of the one end frame 6a and the other end frame 6b, and the rear end side coupling part 7 is provided at a position below the portion to which the seat back frame 1 is mounted.

On the other hand, as shown in FIG. 2, as to the rear end side coupling part 7, its rear end position is located above the front end position. In other words, the rear end side coupling part 7 is formed in a tilted state with respect to the front to back direction, and its rear end extends toward the seat back frame 1 in a state mounted to the respective rear ends of the one end frame 6a and the other end frame 6b.

Of the rear end side coupling part 7 formed in a tilted state, the face located ahead is a face supporting the waist of the occupant seated on the vehicle seat S, and is a curved surface curved so that its center part is swelled backward. Thereby, a seating feeling when the occupant sits on the vehicle seat S is improved.

The front end side coupling part 8 is a portion corresponding to a so-called pan frame, and is expanded backwardly from the respective front ends of the one end frame 6a and the other end frame 6b.

In the present embodiment, as shown in FIG. 8, for the purpose of improving rigidity, concave parts 8a, 8b, 8c are formed at a plurality of locations of the front end side coupling part 8.

The respective concave parts 8a, 8b, 8c are formed by downwardly recessing the portion to which the concave parts 8a, 8b, 8c are provided, of the front end side coupling part 8.

The concave part 8c located in the rearmost part among such concave parts 8a, 8b, 8c is a recess of a substantially square shape in plan view formed in the center of the width direction of the rear end of the front end side coupling part 8.

Then, in the seat cushion frame 2, an opening 2X of a rectangular shape in plan view is formed between the rear end side coupling part 7 and the front end side coupling part 8, and a supporting member such as an S-spring laid above the opening 2X supports the hip of the occupant seated on the vehicle seat S.

In addition, of the front end side coupling part 8, the portion located between the concave part 8c formed to be recessed in a substantially square shape in plan view and the one end frame 6a or the other end frame 6b functions as a leg support part 8d for supporting the legs of the occupant seated on the vehicle seat S.

Then, in the present embodiment, the leg support part 8d is provided in the portion with the heightened rigidity because it is located between the concave part 8c of a substantially square shape in plan view and the one end frame 6a or the other end frame 6b of the front end side coupling part 8 so that the legs of the occupant can be stably supported.

In addition, in the present embodiment, the whole seat cushion frame 2 including the one end frame 6a and the other end frame 6b is molded by CFRP as a resin material but is not limited thereto, and of the seat cushion frame 2, at least the portions to which the rear side link 30 and the front side link 40 are assembled may be made of a resin material.

Next, the height adjustment mechanism 5 will be described.

The height adjustment mechanism 5 according to the present embodiment is disposed between the seat cushion frame 2 and the slide rail mechanism 4 in the up and down direction, and works by operating an operation part (not shown).

Figure 9:
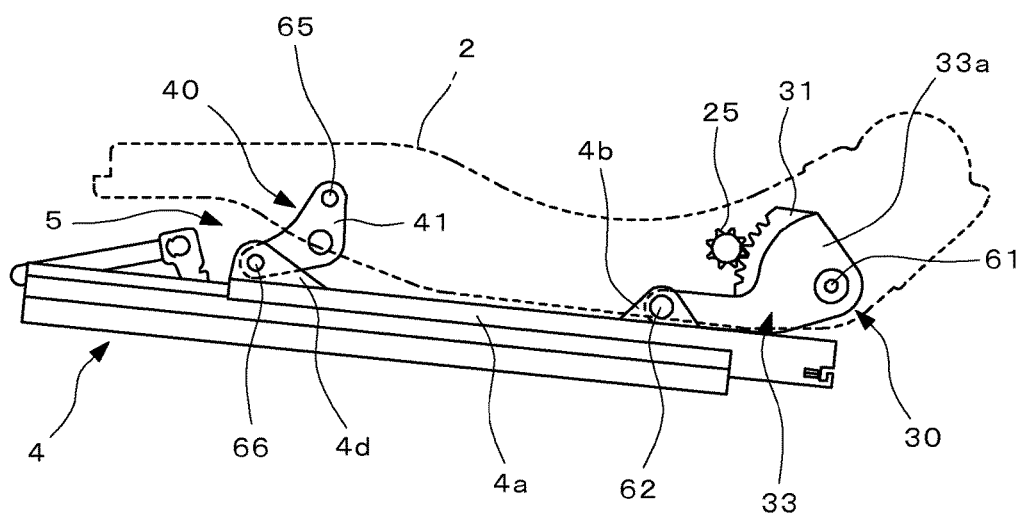
FIG. 9 is an explanatory side view showing a height adjustment mechanism according to the embodiment of the present invention in a state when the vehicle seat is in a normal position.
Figure 10:
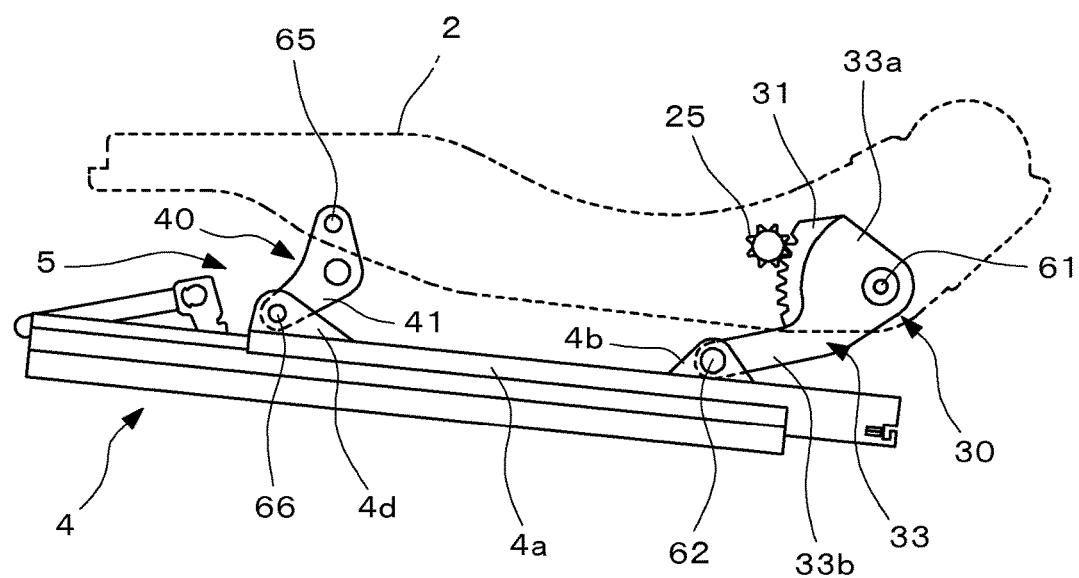
FIG. 10 is an explanatory side view showing the height adjustment mechanism according to the embodiment of the present invention in a state when the vehicle seat is in a raised position.

As to the configuration example of the height adjustment mechanism 5, as shown in FIGS. 9 and 10, the height adjustment mechanism 5 has, as main constituent elements, the rear side link 30 and the front side link 40 as an example of rotating bodies.

The rear side link 30 is mounted to the respective rear ends of the one end frame 6a and the other end frame 6b, and is rotatably supported with respect to a link support projection 4b provided on a movable rail 4a of the slide rail mechanism 4.

The rear side link 30 is provided with a first rotatable arm 33 formed with a sector gear 31, and when a driving force is transmitted from a pinion gear 25 in conjunction with the above operation part to the sector gear 31, it rotates to move between the position shown in FIG. 9 and the position shown in FIG. 10 by the driving force.

Briefly, the first rotatable arm 33 is rotatably journaled (is journaled by a second shaft pin 62) on the link support projection 4b of the movable rail 4a, and is rotatably journaled with respect to the one end frame 6a by a first shaft pin 61 arranged in the link assembling hole 51.

In addition, the first rotatable arm 33 is coupled to a second rotatable arm 34 (not shown) via a coupling pipe 35 (not shown), therefore the second rotatable arm 34 rotates integrally with the first rotatable arm 33.

The second rotatable arm 34 (not shown) is disposed in a position facing the first rotatable arm 33 in the width direction, in a state that the height adjustment mechanism 5 is mounted to the seat cushion frame 2. The second rotatable arm 34 (not shown) is rotatably assembled to the other end frame 6b at one end thereof when the height adjustment mechanism 5 is mounted to the seat cushion frame 2. In addition, the second rotatable arm 34 is assembled to the link support projection 4b of the movable rail 4a at the other end thereof.

In other words, when the driving force is transmitted to the sector gear 31 from the pinion gear 34, the first rotatable arm 33 and the second rotatable arm 34 (not shown) rotate by the driving force, and the up and down position on the rear side of the one end frame 6a and the other end frame 6b is displaced.

In addition, front side link members 41 constituting the front side link 40 are respectively mounted to the respective front ends of the one end frame 6a and the other end frame 6b.

The front side link 40 has a right and left symmetric structure, and therefore the structure of one end of the right and left direction, that is, of the width direction will be described below.

The front side link member 41 is rotatably supported (is journaled by a sixth shaft pin 66) at one end thereof with respect to the link support projection 4d provided on the movable rail 4a of the slide rail mechanism 4, and is rotatably mounted (is journaled by a fifth shaft pin 65) at the other end thereof to the one end frame 6a.

Therefore, the front side link member 41 rotates to move between the position shown in FIG. 9 and the position shown in FIG. 10, in conjunction with the rotation of the rear side link 30.

As described above, the other end frame 6b also is formed with a similar link structure, and the front side link members 41 are paired.

Since the pair of front link members 41 are coupled by a coupling pipe 42 (not shown), both members rotate integrally when rotating.

By the operation of the height adjustment mechanism 5 thus configured, the up and down position of the vehicle seat S can move from a normal position shown in FIG. 9 to a raised position shown in FIG. 10, and conversely, can return from the raised position to the normal position.

Although the driving force from the operation part (not shown) is transmitted to the pinion gear 25 provided on the rear side link 30, the pinion gear 25 is provided with a brake mechanism.

As the brake mechanism, a known structure is adopted, that is, a so-called "brake pinion" is used.

Although a detailed description thereof will be omitted, the pinion gear 25 is mounted to a drive shaft of a brake member for controlling the rotation of the pinion gear 25.

The brake member maintains the operation part (not shown) in a neutral state in a state that the operation part (not shown) is not operated (a normal state), and suppresses the rotation by braking the drive shaft.

On the other hand, when the operation part (not shown) is operated to input the rotational force to the brake member, the brake member applies torque so that the rotational force is amplified to provide a large rotation output to the drive shaft by a light force, and rotates the pinion gear.

The brake mechanism is arranged in such a manner that the drive shaft protrudes inward of the one end frame 6a from the brake member arrangement hole 55 in a state that the brake member protrudes outward of the one end frame 6a.

Then, the pinion gear 25 is mounted to the end (the side arranged inside the one end frame 6a) of the drive shaft.

The brake member arrangement hole 55 is a through-hole formed in the one end frame 6a, and is formed slightly closer to the vehicle front side than the link assembling hole 51.

"The link driving member" in the embodiments refers to the brake mechanism (the pinion gear 25, the drive shaft, and the brake member) for example, and "the height adjustment mechanism mounting part formed as a hole part in which a link driving member is arranged" refers to the link member arrangement hole 55.

Next, a mounting structure of the reclining mechanism 10 to the outside surface 22b of the side frame 22 will be described.

When mounting the reclining mechanism 10 to the side frame 22, the reclining mechanism 10, more specifically, an outer surface 12c of the inner case piece 12b, is connected and fixed to the outside surface 22b of the side frame 22. Here, whereas the material of the inner case piece 12b is metal, the material of the side frame 22 is CFRP, so that it is difficult to fix by welding when connecting and fixing the case 12 of the reclining mechanism 10 to the outside surface 22b of the side frame 22.

Thus, in the process of manufacturing the vehicle seat S of the present embodiment, a method in which the side frame 22 and the side part frames 6a, 6b are coupled by mounting the case 12 of the reclining mechanism 10, of the outside surface 22b of the side frame 22, to a portion to which the reclining mechanism 10 is mounted, and the configuration of the side part frames 6a, 6b will be described.

Method of Coupling the Side Frame 22 and the Side Part Frames 6a, 6b)

Next, with reference to FIGS. 11 to 21, a method of coupling the side frame 22 and the side part frames 6a, 6b will be described.

Main configurations are similar on both sides, and therefore a method of coupling the side frame 22 and the side part frame 6a (the one end frame 6a) via the reclining mechanism 10 will be described.

In addition, in this configuration example, the coupling bracket 9 is also used on the side part frame 6b (the other end frame 6b) but is not limited thereto, the coupling bracket 9 may not be used on the side part frame 6b (the other end frame 6b).

Further, in FIGS. 11 to 21, the illustration of the reclining mechanism 10 or the like is simplified for illustrative purposes (The details of internal structure or the like are as described above).

Figure 11:
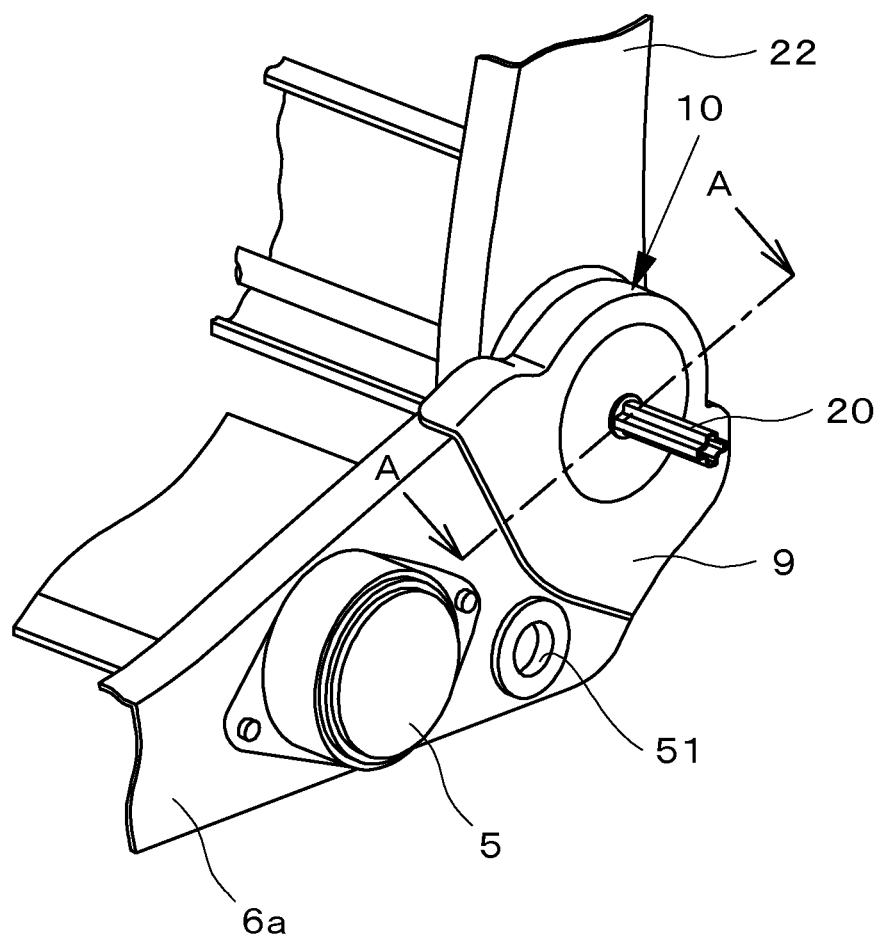
FIG. 11 is an enlarged explanatory perspective view of the periphery of the reclining mechanism according to the embodiment of the present invention.
Figure 12:
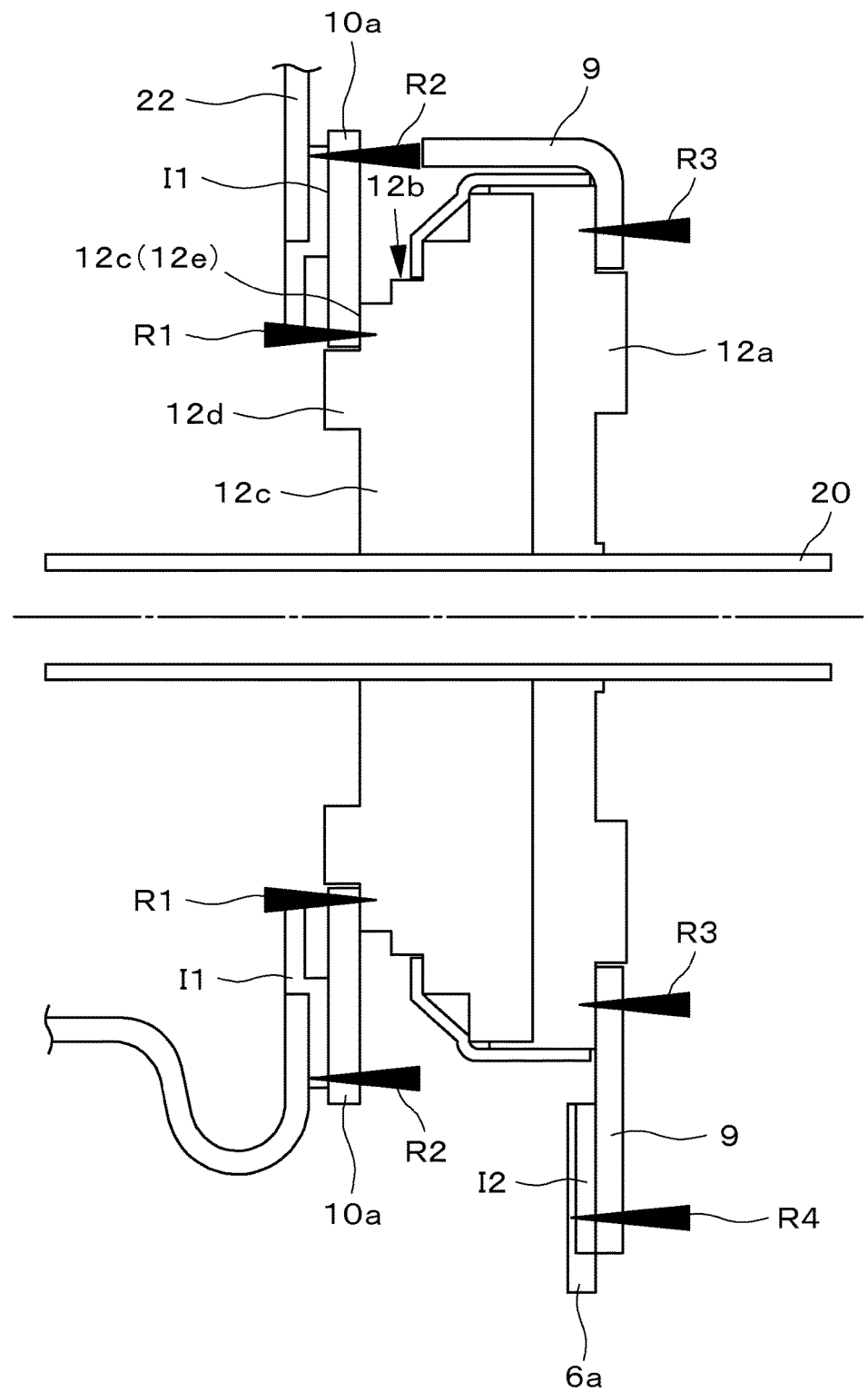
FIG. 12 is a cross-sectional explanatory view taken along the line A-A of FIG. 11.

As shown in FIGS. 11 and 12, the coupling bracket 9 is coupled to the rear end of the side part frame 6a, and via the coupling bracket 9 and the reclining mechanism 10, the side frame 22 is mounted to the side part frame 6a.

In the present embodiment, the coupling bracket 9 is laser-welded to the side part frame 6a.

However, the coupling bracket 9 is not limited thereto and may be mounted thereto by adhesives.

In addition, in the present embodiment, the reclining mechanism 10 also is laser-welded to the side frame 22.

Similarly, the reclining mechanism 10 also may be mounted thereto by adhesives.

As thus described, in the present embodiment, the reclining mechanism 10 is mounted to the outside surface 22b of the side frame 22 by laser welding or adhesives so that the mounting of the reclining mechanism 10 can be easily performed without complicating the structure for mounting the reclining mechanism 10 to the side frame 22, as in the case where the reclining mechanism 10 is over-molded into the frame at the time of molding of the seat back frame 1, for example.

Figure 13:
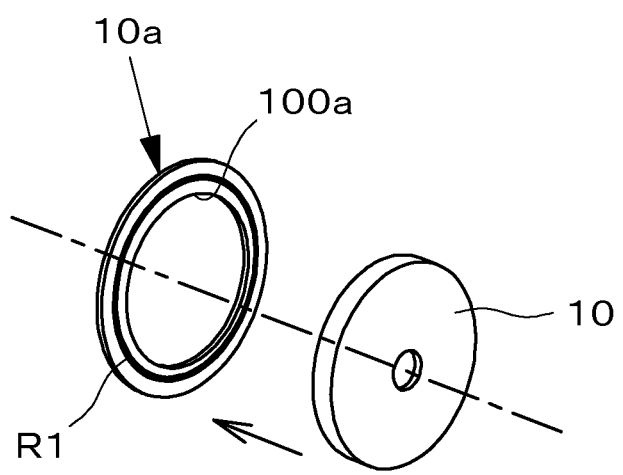
FIG. 13 is an explanatory perspective view showing an assembling process of the reclining mechanism according to the embodiment of the present invention.
Figure 14:
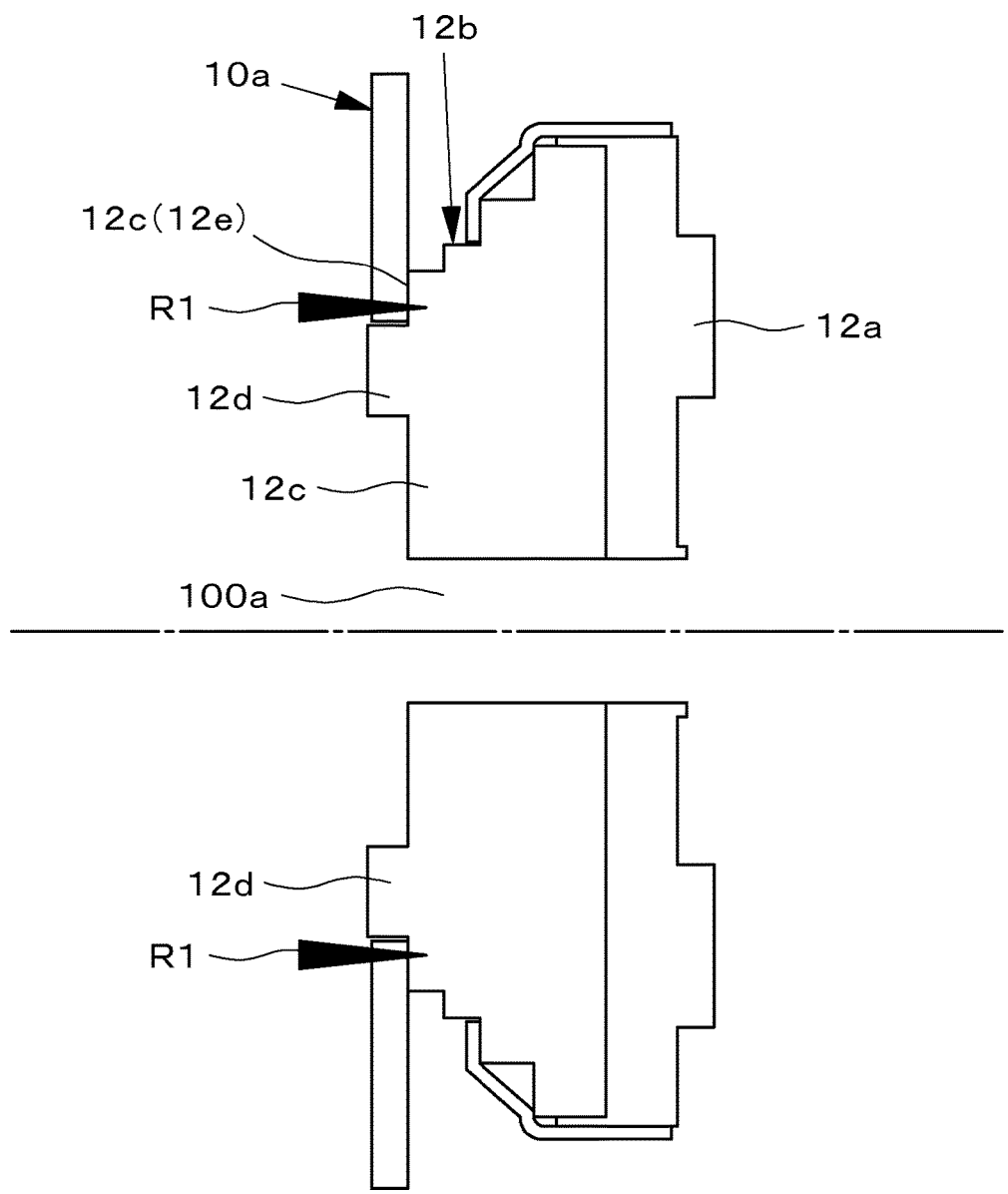
FIG. 14 is a cross-sectional explanatory view of a corresponding portion of the A-A line, showing the assembled state of FIG. 13.

First, as shown in FIGS. 13 and 14, the reclining mechanism 10 is mounted to the circular ring shaped mounting bracket 10a.

This is performed as follows: the outer peripheral part of positioning projections 12d protruding outward from the outer surface 12c of the inner case piece 12b is assembled in a locked state to the inner peripheral part of a mounting hole 100a formed in the center part of the mounting bracket 10a. After that, of the outer surface 12c of the inner case piece 12b, a non-projection region 12e (an outer peripheral portion) where the positioning projections 12d are not formed is laser-welded to the peripheral part of the mounting hole 100a of the mounting bracket 10a.

This welding point is shown by R1.

Figure 15:
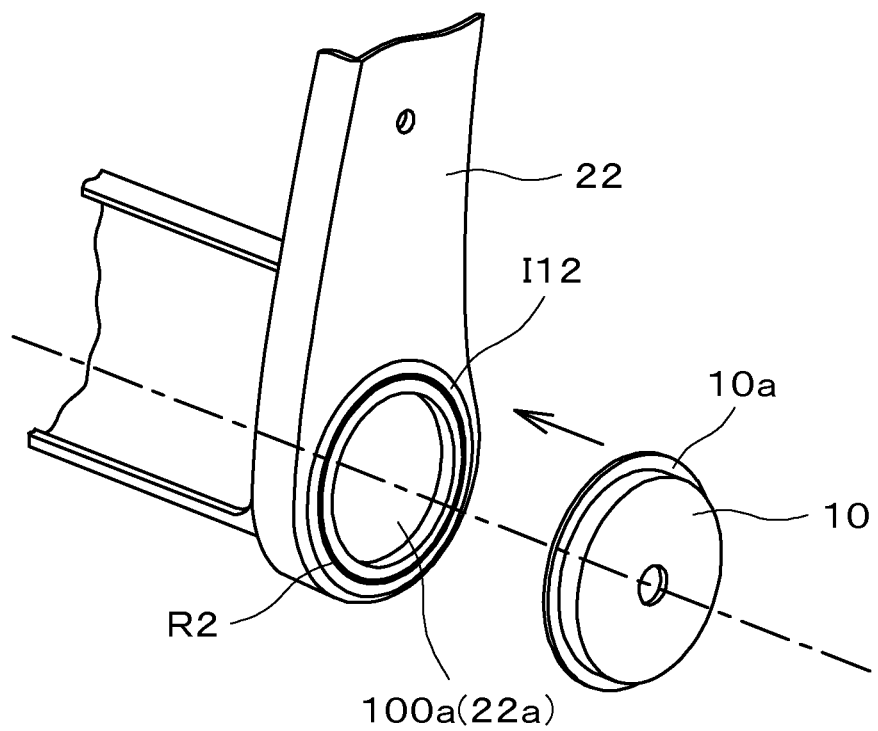
FIG. 15 is an explanatory perspective view showing the assembling process of the reclining mechanism according to the embodiment of the present invention.
Figure 16:
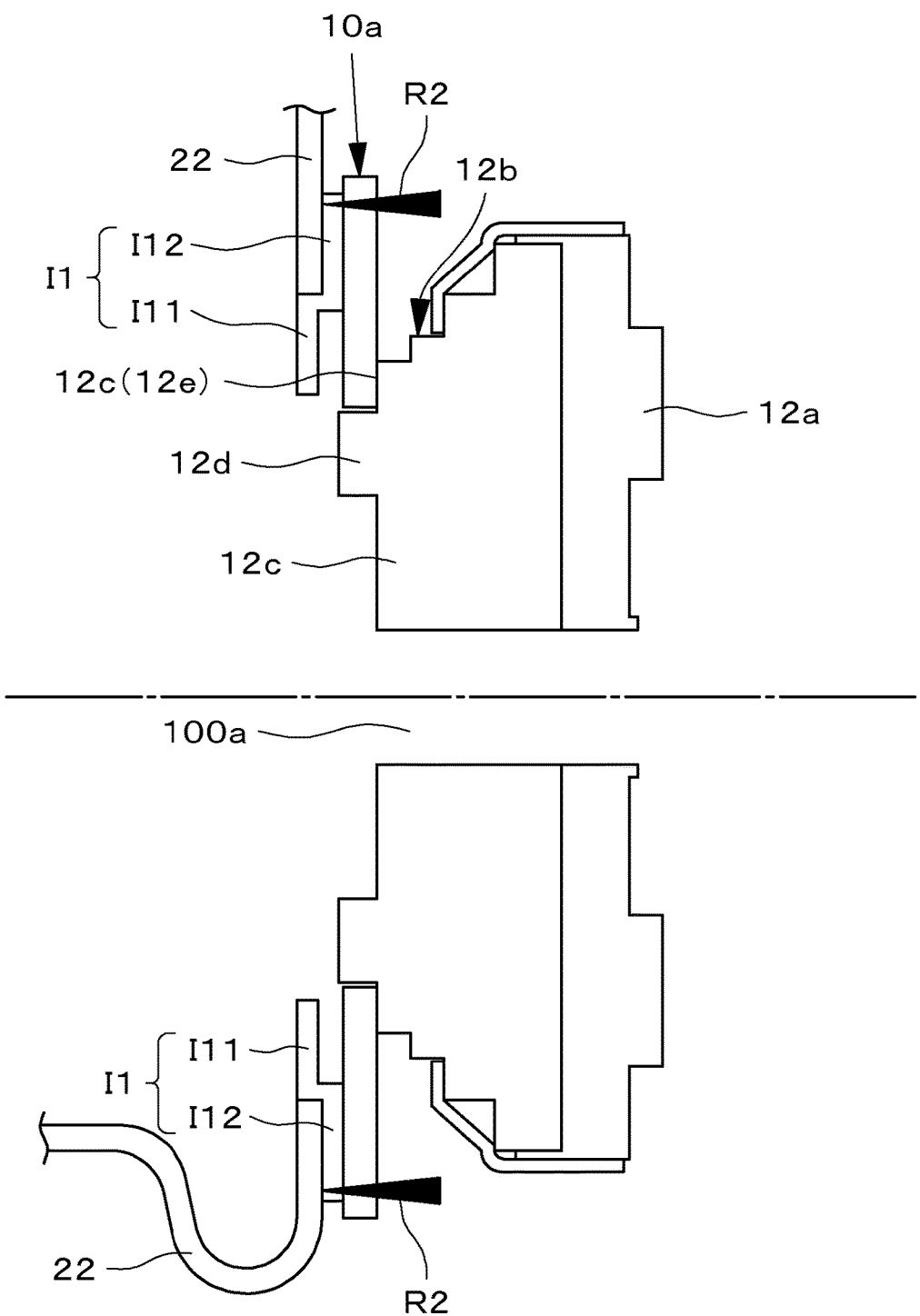
FIG. 16 is a cross-sectional explanatory view of the corresponding portion of the A-A line, showing the assembled state of FIG. 15.

Next, as shown in FIGS. 15 and 16, the mounting bracket 10a to which the reclining mechanism 10 is mounted is laser-welded to the outer peripheral portion of the reclining mechanism arrangement hole 22a formed in the side frame 22.

In this example, the iron plate piece I1 of a circular ring shape is mounted to the reclining mechanism arrangement hole 22a.

The iron plate piece I1 is constituted by having an inner peripheral iron plate piece I11 and an outer peripheral iron plate piece I12.

The inner peripheral iron plate piece I11 is a circular ring shaped iron plate, and is configured so that an outer peripheral diameter thereof is almost identical to the reclining mechanism arrangement hole 22a.

In addition, the outer peripheral iron plate piece I12 is a circular ring shaped member, and is configured so that an inner peripheral diameter thereof is almost identical to the reclining mechanism arrangement hole 22a.

The outer peripheral iron plate piece I12 is concentrically layered so that the inner peripheral diameter portion thereof aligns with the outer peripheral portion of the inner peripheral iron plate piece I11.

Therefore, as shown in FIG. 16, the cross-sectional shape of the iron plate piece I1 is a shape in which a step of the thickness of the inner peripheral iron plate piece I11 is formed. Then, it is configured so that the thickness of the step and the thickness of the lower end of the side frame 22 are almost identical.

In other words, the iron plate piece I1 is engaged with the reclining mechanism arrangement hole 22a by the step, and the outer peripheral iron plate piece I12 is insert-molded therein in a form that it extends to the outside surface of the side frame 22.

Then, the mounting bracket 10a to which the reclining mechanism 10 is mounted is welded to the outside surface of the outer peripheral iron plate piece I12.

This welding point is shown by R2.

Figure 17:
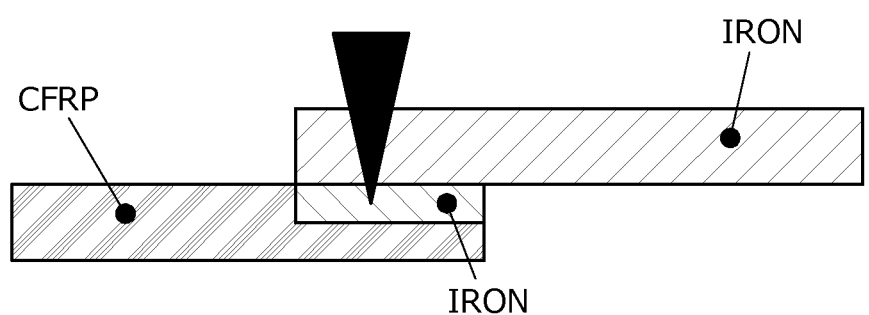
FIG. 17 is a typical explanatory view showing a different material welding connection technique.

In addition, with reference to FIG. 17, the welding connection of the side frame 22 molded by CFRP and the mounting bracket 10a which is a metal member will be briefly described.

In the present embodiment, the iron plate piece I1 is used for connecting by welding CFRP which is a resin and a metal.

In other words, the iron plate piece I1 is insert-molded in the welding point of CFRP which is a resin, and the outer peripheral iron piece I12 is exposed as a weld surface.

Then, the mounting bracket 10a which is a metal is welded to that portion, thereby connecting the both.

As thus configured, a resin material and a metal material which are different materials can be coupled by welding, and the rigidity of that portion is also improved because the iron plate piece I1 is insert-molded therein.

Figure 18:
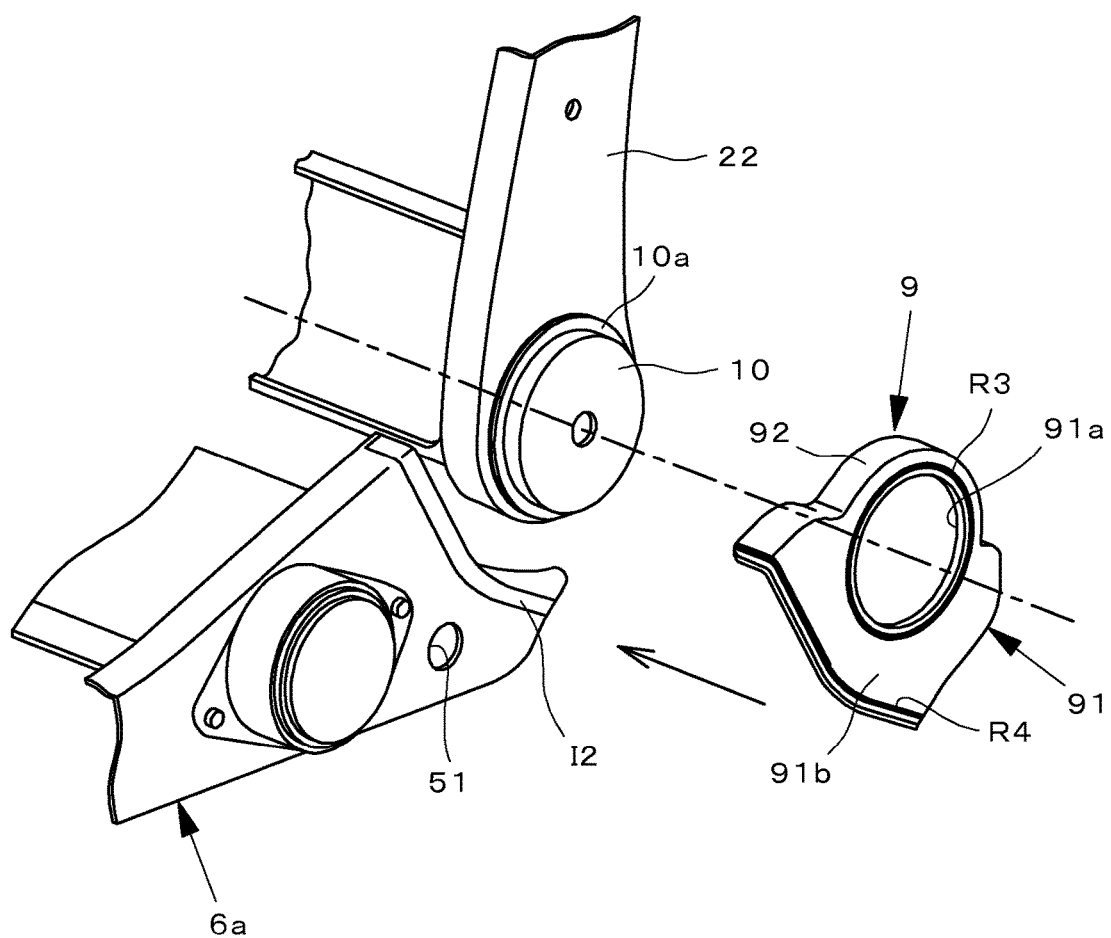
FIG. 18 is an explanatory perspective view showing the assembling process of the reclining mechanism according to the embodiment of the present invention.
Figure 19:
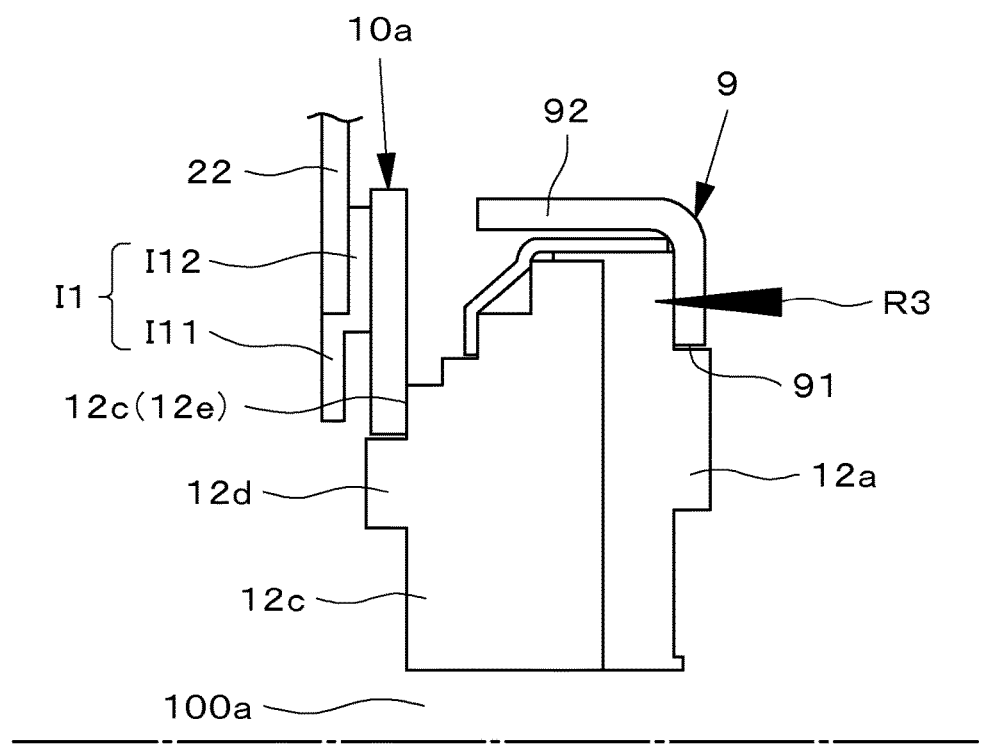
FIG. 19 is a cross-sectional explanatory view of the corresponding portion of the A-A line, showing the assembled state of FIG. 18.
Figure 19:
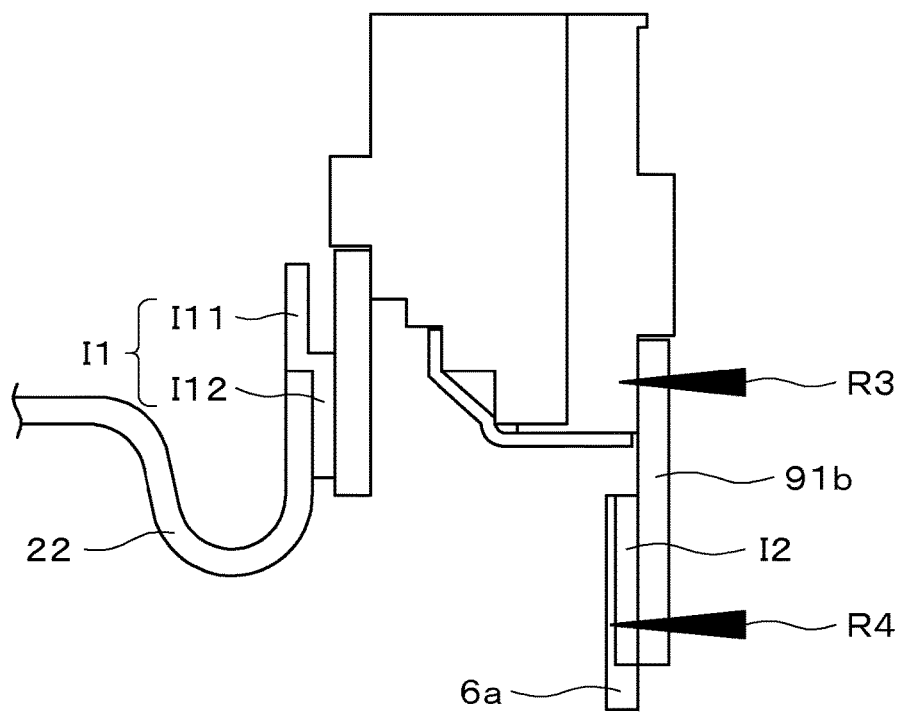
Figure 20:
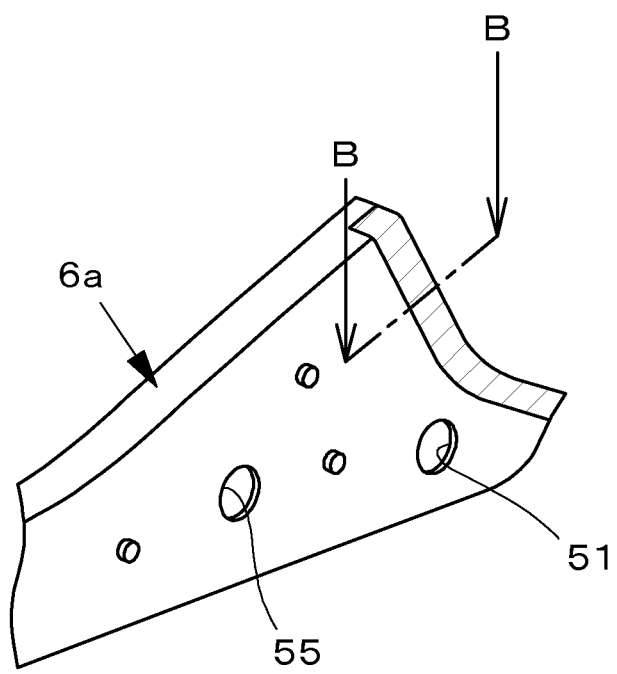
FIG. 20 is an enlarged explanatory perspective view of the vicinity of the welded part of a side part frame according to the embodiment of the present invention.

Next, as shown in FIGS. 18 and 19, the metallic coupling bracket 9 is laser-welded to the reclining mechanism 10 mounted to the side frame 22 and the rear end of the side part frame 6a.

This coupling bracket 9 corresponds to "the coupling member".

This coupling bracket 9 is configured with a bottom surface part 91 and an outer peripheral edge part 92.

As to the bottom surface part 91, its outer periphery is partly curved in an arc shape to conform to a part of the outer periphery of the reclining mechanism 10, and from that portion, an extended portion to conform to the shape of the rear end of the side part frame 6a is formed.

Then, the outer peripheral edge part 92 extending while bending substantially vertically with respect to the bottom surface part 91 is formed along the arc shaped portion and the extended portion from that portion to conform to the shape of the rear end side of the side part frame 6a.

In other words, the outer peripheral edge part 92 is configured to extend along the upper edge of the rear end of the side part frame 6a from the upper portion of the reclining mechanism 10 and cover that portion.

In addition, the height (the distance from the bottom surface part 91) of the outer peripheral edge 92 is configured to be almost identical to the thickness of the reclining mechanism 10, and therefore it is possible to secure the space in which the reclining mechanism 10 is present.

Further, a circular hole part 91a is formed in the bottom surface part 91 so that the outer surface of the outer case piece 12a is exposed.

Hereinafter, the extended portion conforming to the shape of the rear end of the side part frame 6a and constituting the coupling bracket 9 is described as "a side part frame mounted part 91b".

The coupling bracket 9 is disposed to cover the position where the hole part 91a is formed and the arc portion of the upper part thereof to align with the reclining mechanism 10 welded to the side frame 22, and is disposed to cover the side part frame mounted part 91b to align with the rear end of the side part frame 6a.

In this state, the peripheral portion of the hole part 91a and the outer case piece 12a are welded (this welding point is marked as R3), and the side part frame mounted part 91b and the rear end of the side part frame 6a are welded (this welding point is marked as R4).

The side part frame mounted part 91b has a shape which is curved to escape to the rear side (to overhang toward the front upper side) with respect to the link assembling hole 51 when mounted to the rear end of the side part frame 6a.

Therefore, when assembling the height adjustment mechanism 5, the inhibition of assembling work by the coupling bracket 9 can be effectively prevented.

In addition, by curving the welding portion in this manner, the welding area can be secured large compared to the case where it is linearly formed so that the mounting rigidity of the coupling bracket 9 is improved.

Further, the coupling bracket 9 is configured so that the lower side (the side welded to the side part frame 6a) has a larger area than the upper part.

Thereby, the welding area to the side part frame 6a can be secured large, so that the mounting rigidity is further improved.

The rear end portion of the side part frame 6a at this time will be described.

As shown in FIGS. 18 to 21, the iron plate piece I2 is insert-molded in the rear end portion of the side part frame 6a.

In the present embodiment, the iron plate piece I2 is insert-molded along the shape of the rear end portion of the side part frame 6a.

In other words, in the present embodiment, the iron plate piece I2 is insert-molded from the outside surface of the rear end of the side part frame 6a over the edge portion (corresponding to "the upper side surface") extending while bending inward from the upper part of the outside surface.

Therefore, the coupling bracket 9 is welded and connected at the covering portion in a state that the iron plate piece I2 arranged over the outside surface and the upper side surface of the rear end of the seat cushion frame is covered.

Therefore, the mounting rigidity of the coupling bracket 9 is further improved.

Although the iron plate piece I2 is integral over the outside surface and the upper side surface, it may be configured to be insert-molded in a part of the outside surface and a part of the upper side surface (namely, to be insert-molded as a plurality of components).

Figure 21A:
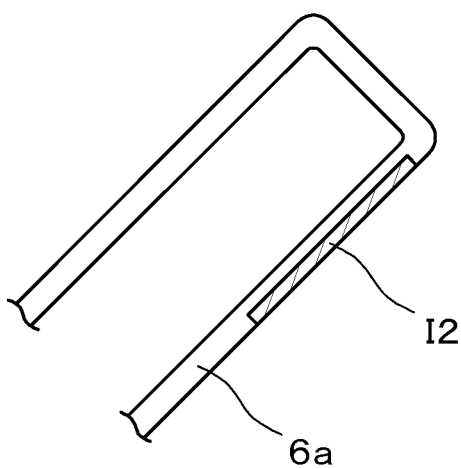
FIGS. 21A & B are cross-sectional explanatory views taken along the line B-B of FIG. 20.
Figure 21B:
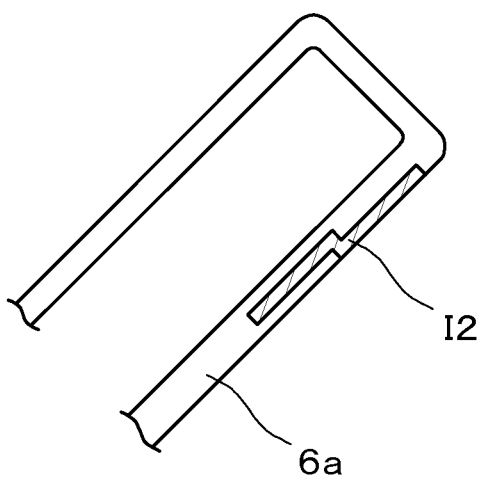

In the present embodiment, as shown in FIG. 21A, a flat plate shaped iron plate is inserted as the iron plate piece I2 but it is not limited thereto, and the iron plate may be configured to have a step into a substantially Z-shaped cross section as shown in FIG. 21B.

As thus configured, the face in a position exposed on the surface can be used as the weld surface, and the side buried inside contributes to the improvement of the rigidity without affecting the appearance.

In addition, as noted above (as to FIG. 17), the welding connection of the side part frame 6a molded by CFRP and the mounting bracket 9 which is a metal member will be briefly described.

In the present embodiment, the iron plate piece I was used for connecting by welding CFRP which is a resin and a metal.

In other words, the iron plate piece I2 is insert-molded in the welding point of CFRP which is a resin, and the weld surface is exposed.

Then, the side part frame mounted part 91b of the mounting bracket 9 which is a metal is welded to that portion, thereby connecting both.

In this manner, as shown in FIG. 12, with the four welding points R1, R2, R3, and R4, the lower end of the side frame 22 and the rear end of the side part frame 6a are rotatably coupled via the coupling bracket 9 and the reclining mechanism 10.

As thus configured, assembling can be easily performed, and the number of components is reduced because components such as fastening members are not necessary so that an increase in size of the reclining mechanism 10 can be suppressed, which is advantageous also in cost.

In addition, the side part frame mounted part 91b extends to a position to overlap the rear end of the link assembling hole 51 in the up and down direction, in a state that the coupling bracket 9 is thus mounted thereto.

As thus configured, the rigidity in the vicinity of the link assembling hole 51 is improved, and along with this, the rigidity of the height adjustment mechanism 5 is improved.

Similarly, the iron plate piece I2 inserted in the position aligned with the side part frame mounted part 91b also extends to the position to overlap the rear end of the link assembling hole 51 in the up and down direction.

Hence, the rigidity in the vicinity of the link assembling hole 51 is further improved, and along with this, the rigidity of the height adjustment mechanism 5 is further improved.

The outer surface 12c of the inner case piece 12b is not limited to the case where the positioning projections 12d are formed thereon, and the outer surface 12c is not formed with the positioning projections 12d and may have a planar front face. In such a case, the welding area can be increased by an amount that the positioning projections 12d are not provided, so that the reclining mechanism 10 can be favorably coupled to the side frame 22 and can be stably disposed at the mounting position.

First Modification Example

Next, with reference to FIGS. 22 and 23, a first modification example will be described.

The first modification example is an example different in the area where a second iron plate piece I102 is inserted.

Since the other configurations are similar to the above embodiment, a description thereof will be omitted.

In this example, the area where the second iron plate piece I102 is inserted extends to the peripheral edge part of the link assembling hole 51.

In other words, the second iron plate piece I102 is arranged (is insert-molded) to surround the periphery of the link assembling hole 51.

As thus configured, the rigidity in the vicinity of the link assembling hole 51 is improved, and the rigidity of the height adjustment mechanism 5 is improved.

Figure 22:
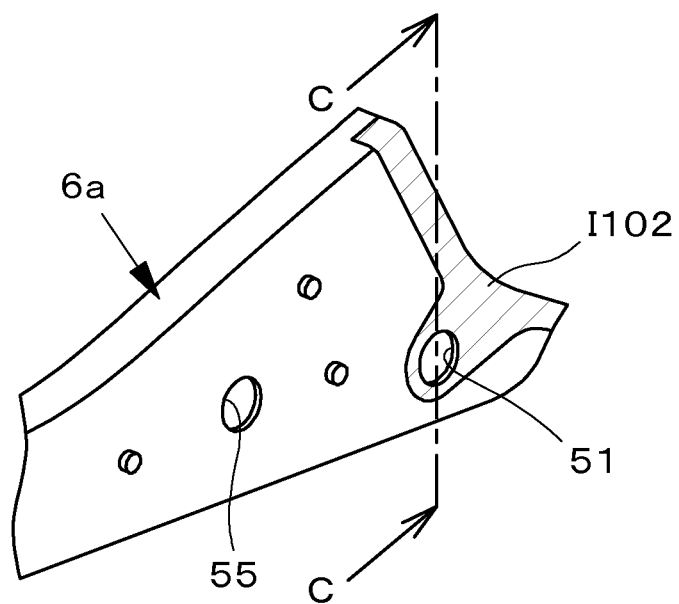
FIG. 22 is an explanatory perspective view showing a first modification example.

FIG. 23 shows a cross-sectional view taken along the line C-C of FIG. 22.

Figures 23A, 23B, 23C:
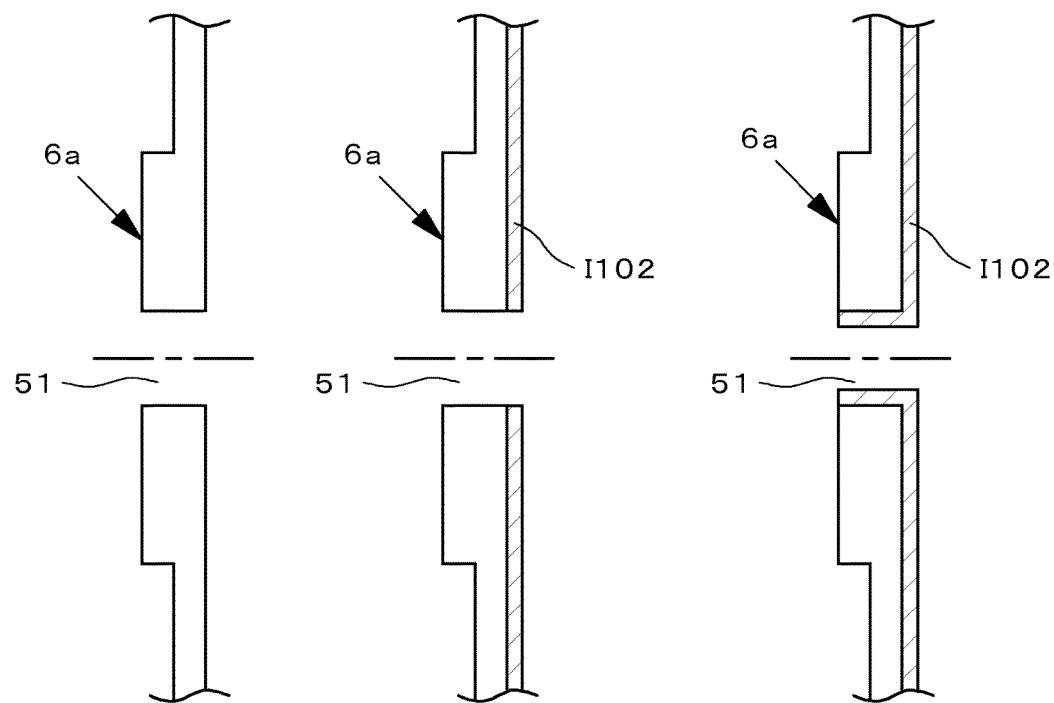
FIG. 23A-C are a cross-sectional explanatory views taken along the line C-C of FIG. 22.

FIG. 23A is in a state that the iron plate piece I102 is not insert-molded.

In this example, as shown in FIG. 23B, the iron plate piece I102 is insert-molded to be arranged in the periphery of the link assembling hole 51.

However, this is not limited thereto, and as shown in FIG. 23C, the iron plate piece I102 may be insert-molded to wrap around to an inner wall portion of the link assembling hole 51.

As thus configured, the rigidity of the link assembling hole 51 is further improved.

Since the link assembling hole 51 is a hole in which the rear side link 30 (the sector gear 31) of the height adjustment mechanism 5 is journaled, it is preferable that further rigidity can be secured.

Second Modification Example

Figure 24:
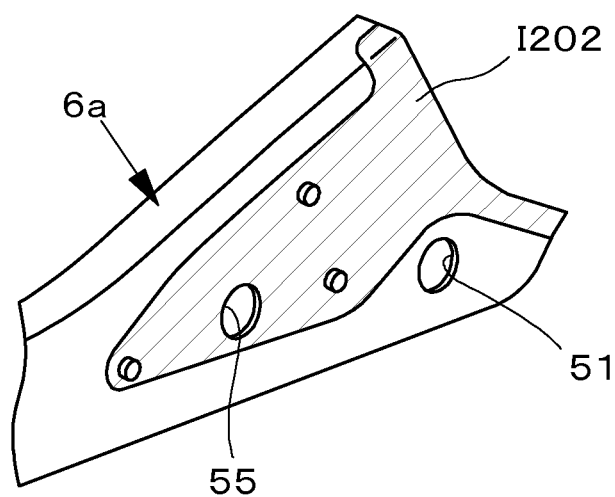
FIG. 24 is an explanatory perspective view showing a second modification example.

Next, with reference to FIG. 24, a second modification example will be described.

The second modification example is an example different in the area where a third iron plate piece I202 is inserted.

Since the other configurations are similar to the above embodiment, a description thereof will be omitted.

In this example, the area where the third iron plate piece I202 is inserted extends to the peripheral edge part of the brake member arrangement hole 55.

As thus configured, the rigidity in the vicinity of the brake member arrangement hole 55 is improved, and the rigidity of the height adjustment mechanism 5 is improved.

Since the brake member arrangement hole 55 is a hole in which the pinion gear 25 with the brake member is journaled, it is preferable that further rigidity can be secured.

The configurations of the periphery and the inner wall surface of the brake member arrangement hole 55 are similar to FIG. 23.

Third Modification Example

Figure 25:
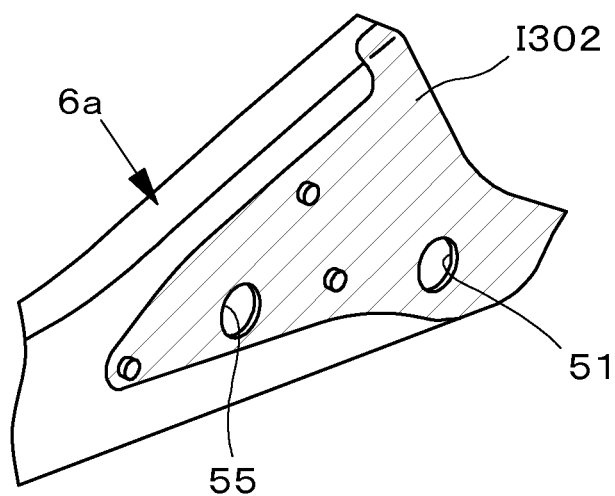
FIG. 25 is an explanatory perspective view showing a third modification example.

Next, with reference to FIG. 25, a third modification example will be described.

The third modification example is an example different in the area where a fourth iron plate piece I302 is inserted.

Since the other configurations are similar to the above embodiment, a description thereof will be omitted.

In this example, the area where the fourth plate piece I302 is inserted extends to the peripheral edge parts of the link assembling hole 51 and the brake member arrangement hole 55.

As thus configured, the rigidity in the vicinity of link assembling hole 51 and the brake member arrangement hole 55 is improved, and the rigidity of the height adjustment mechanism 5 is improved.

Since the link assembling hole 51 is a hole in which the rear side link 30 (the sector gear 31) of the height adjustment mechanism 5 is journaled, it is preferable that further rigidity can be secured.

Further, since the brake member arrangement hole 55 is a hole in which the pinion gear 25 with the brake member is journaled, it is preferable that further rigidity can be secured.

The configurations of the periphery and the inner wall surface of the link assembling hole 51 and the brake member arrangement hole 55 are similar to FIG. 23.

Fourth Modification Example

Figure 26:
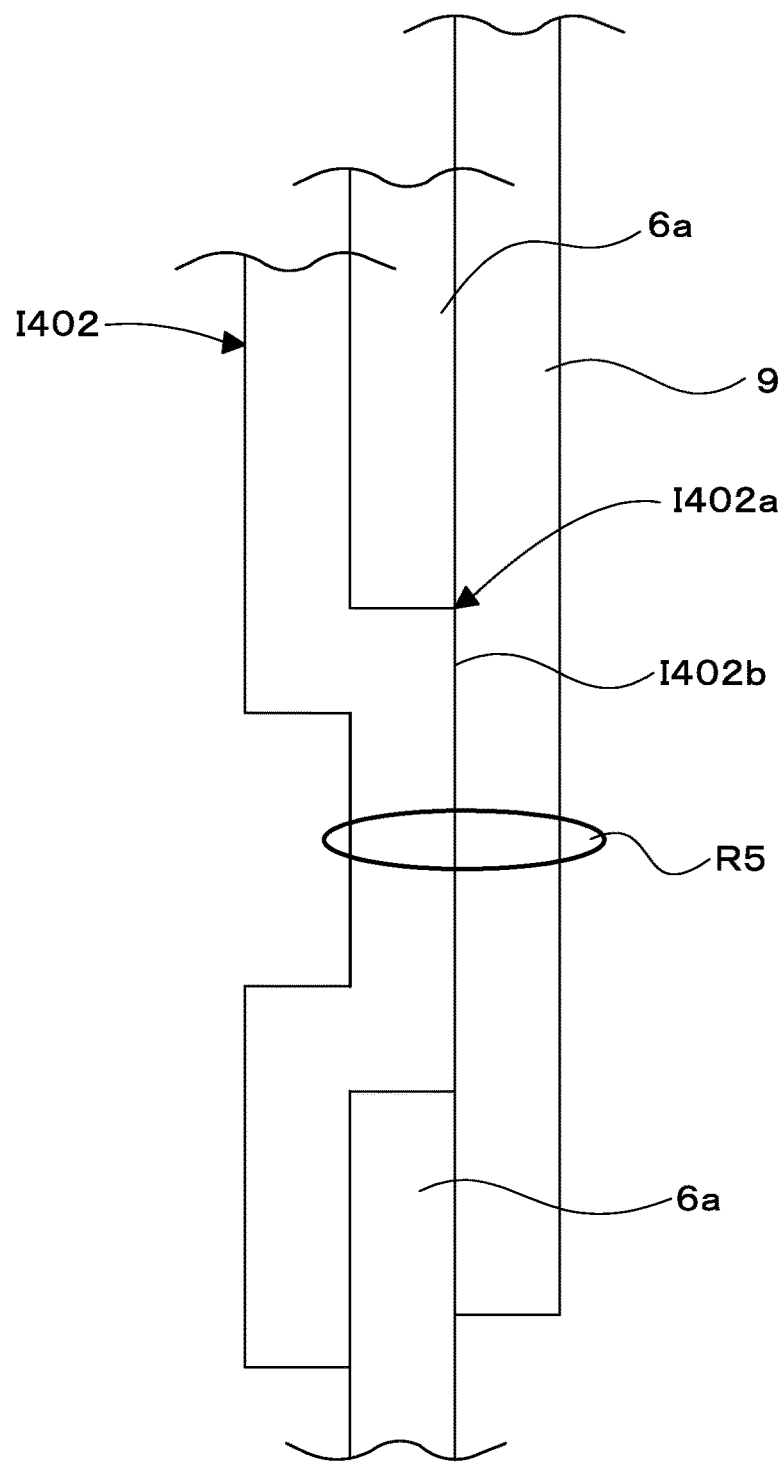
FIG. 26 is an explanatory side view showing a fourth modification example.

With reference to FIG. 26, a fourth modification example will be described.

In this example, the rear end portion of the side part frame 6a is modified.

As shown in the above FIGS. 18 to 21, the iron plate piece I is insert-molded in the rear end portion of the side part frame 6a.

In this example, although a fifth iron plate piece I402 is insert-molded along the shape of the rear end portion of the side part frame 6a, the cross-sectional shape thereof is modified as shown in FIG. 26.

In other words, the fifth iron plate piece I402 has a shape in which a cross-sectional convex part I402a protruding to the coupling bracket 9 side is formed, and the cross-sectional convex part I402a portion is insert-molded in the side part frame 6a.

Then, a top surface portion I402b of the cross-sectional convex part I402a is exposed to the coupling bracket 9 side, and the coupling bracket 9 is welded and connected at a covering portion (a welding point R5) in a state that the top surface portion I402b is covered.

Therefore, the mounting rigidity of the coupling bracket 9 is further improved.

In addition, as thus configured, the face in a position exposed on the surface can be used as the weld surface, and the side arranged inward contributes to the improvement of the rigidity without affecting the appearance.

Fifth Modification Example

Figure 27:
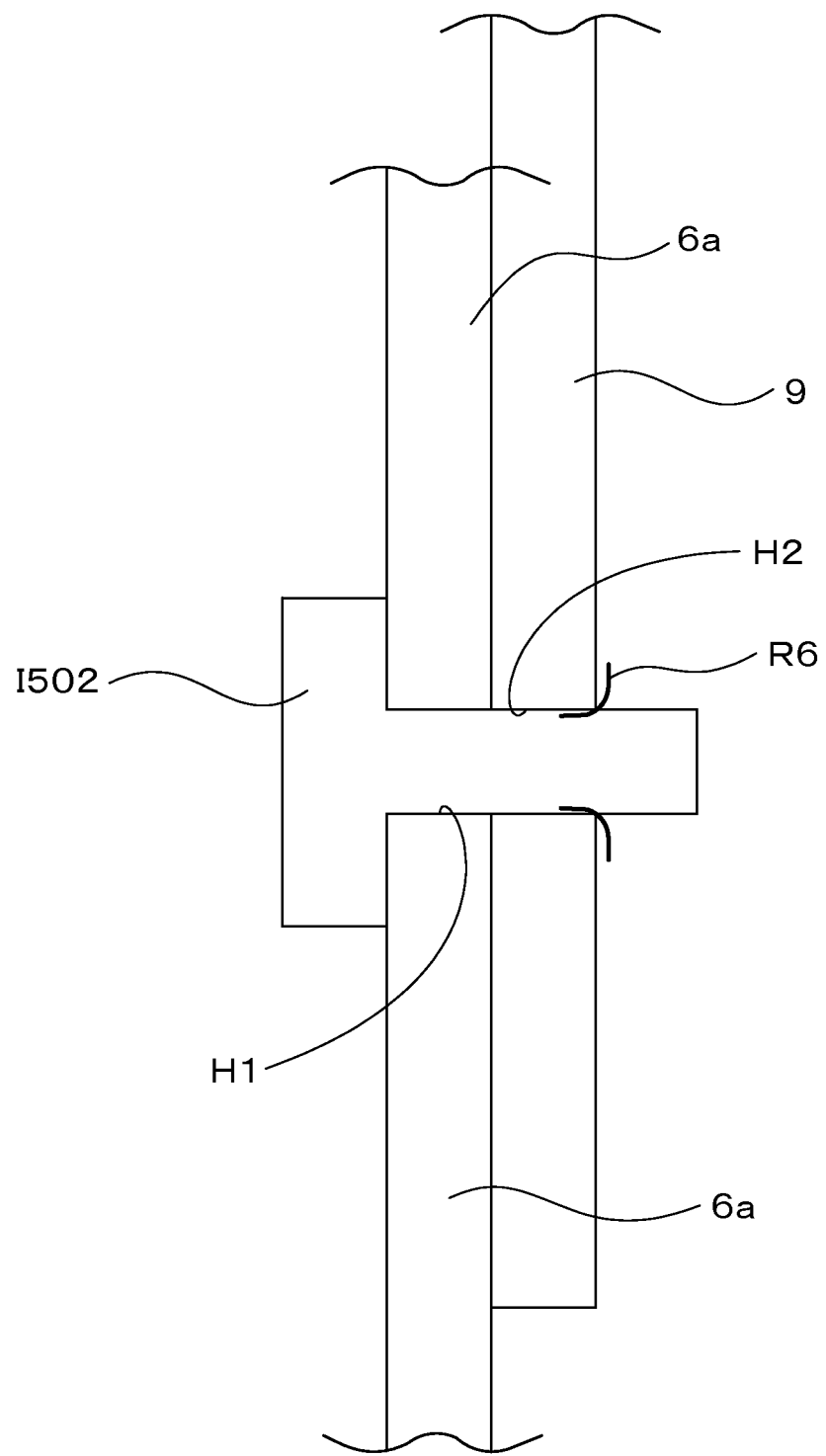
FIG. 27 is an explanatory side view showing a fifth modification example.

With reference to FIG. 27, a fifth modification example will be described.

In this example, the rear end portion of the side part frame 6a is modified.

In the above FIGS. 18 to 21, the iron plate piece I was insert-molded in the rear end portion of the side part frame 6a.

However, in this example, an iron pin I502 is used instead of the iron plate piece I.

A frame-side iron pin through-hole H1 is appropriately formed in the rear end portion of the side part frame 6a, and the iron pin I502 is fixed to the frame-side iron pin through-hole H1.

In other words, the iron pin I502 is fixed in such a manner that the head of the iron pin I502 is arranged inward and the free end side of the leg protrudes outward (to the coupling bracket 9 side).

Then, of the coupling bracket 9, a bracket-side iron pin through-hole H2 is formed in a position aligned with the iron pin through-hole H1, the coupling bracket 9 is disposed to cover the rear end portion of the side part frame 6a so that the frame-side iron pin through-hole H1 and the bracket-side iron pin through-hole H2 are communicated with each other, and the leg of the iron pin I502 is inserted through the bracket-side iron pin through-hole H2.

Next, a contact portion (a welding point R6) of the bracket-side iron pin through-hole H2 and the iron pin I502 is welded and connected.

Therefore, the mounting rigidity of the coupling bracket 9 is further improved.

In addition, as thus configured, the vicinity of the frame-side iron pin through-hole H1 and the bracket-side iron pin through-hole H2 is reinforced by the head of the iron pin I502 arranged inward, which contributes to the improvement of the rigidity.

DESCRIPTION OF REFERENCE NUMERALS

S: Vehicle seat
S1: Seat back
S2: Seat cushion
S3: Headrest
HP: Headrest pillar
1a, 2a, 3a: Cushion pad
1b, 2b, 3b: Skin material
1: Seat back frame
   21: Upper frame
   22: Side frame
      22a: Reclining mechanism arrangement hole
      22b: Outside surface
   23: Lower frame
2: Seat cushion frame
   6a: Side part frame (One end frame)
      51: Link assembling hole (Height adjustment mechanism mounting part)
      53: Link assembling hole
      55: Brake member arrangement hole
      I1, I2: Iron plate piece (Metal member)
         I11: Inner peripheral iron plate piece
         I12: Outer peripheral iron plate piece
      I102: Second iron plate piece
      I202: Third Iron plate piece
      I302: Fourth iron plate piece
      I402: Fifth iron plate piece
      I502: Iron pin
   6b: Side part frame (The other end frame)
      52: Link assembling hole
      54: Link assembling hole
4: Slide rail mechanism
   4a: Movable rail
   4b, 4d: Link support projection
5: Height adjustment mechanism
   30: Rear side link
   25: Pinion gear
   31: Sector gear
   33: First rotatable arm
   34: Second rotatable arm
   35: Coupling pipe
   61: First shaft pin
   62: Second shaft pin
   40: Front side link
   41: Front side link member
   42: Coupling pipe
   65: Fifth shaft pin
   66: Sixth shaft pin
7: Rear end-side coupling part
8: Front end-side coupling part
   8a, 8b, 8c: Concave part
   8d: Leg support part
9: Coupling bracket (Coupling member)
   91: Bottom surface part
      91a: Hole part
      91b: Side part frame mounted part (lower part)
   92: Outer peripheral edge part
10: Reclining mechanism
   11: Reclining mechanism main body
   12: Case
      12a: Outer case piece
      12b: Inner case piece
      12c: Outer surface
      12d: Positioning projection
      12e: Non-projection region
   13: Engaging gear
   14: Lock gear part
   15: Sliding lock member
   16: Path regulating part
   17: Cam surface
   18: Cam body
   19: Spring body
   20: Rotary shaft
   10a: Mounting bracket
      100a: Mounting hole
   H1: Frame-side iron pin through-hole
   H2: Bracket-side iron pin through-hole
   K1, K2: Locking part
   P: Spiral spring
      P1: One end
      P2: The other end
   R1, R2, R3, R4: Welding point
   T: Operating lever

The invention claimed is:

1. A vehicle seat comprising:
a seat back frame on which a reclining mechanism is arranged at a lower part thereof; and
a seat cushion frame made at least partly of a resin material,
wherein
the reclining mechanism, arranged on a lower end side of the seat back frame, and a rear end side of the seat cushion frame are coupled with a metallic coupling member,
a metal member is integrally formed on the rear end side of the seat cushion frame,
an upper part of the coupling member is mounted to the reclining mechanism, and a lower part of the coupling member is welded and connected to the metal member provided on the rear end side of the seat cushion frame,
the seat cushion frame is provided with a height adjustment mechanism mounting part to which a height adjustment mechanism for displacing a height of the seat cushion frame with respect to a vehicle floor is mounted, and
the coupling member extends to a position aligned with at least a part of the height adjustment mechanism mounting part in an up and down direction in a state that the coupling member is welded to the rear end side of the seat cushion frame.

2. The vehicle seat according to claim 1, wherein
the metal member is arranged on at least a part of an outside surface of a rear end of the seat cushion frame and on at least a part of an upper side surface extending while bending inward from an upper part of the outside surface, and
the coupling member is welded and connected at a covering portion in a state that the metal member portion arranged on the outside surface and the upper side surface of the rear end of the seat cushion frame is covered.

3. The vehicle seat according to claim 1, wherein
the height adjustment mechanism is configured as a link mechanism, the height adjustment mechanism mounting part is provided as a hole part in which a link central axis or a link driving member is arranged, and the metal member extends to a position where the height adjustment mechanism mounting part is provided.

4. The vehicle seat according to claim 3, wherein the coupling member is configured by being curved in such a manner that a mounting point thereof to the seat cushion frame extends toward a front upper side of the seat cushion frame in a state that the coupling member is welded to the rear end side of the seat cushion frame, and the metal member is arranged by being curved to align with a shape of the mounting point of the coupling member to the seat cushion frame.

5. The vehicle seat according to claim 1, wherein the seat cushion frame is provided with a height adjustment mechanism mounting part to which a height adjustment mechanism for displacing a height of the seat cushion frame with respect to a vehicle floor is mounted, and the metal member extends to a position aligned with at least a part of the height adjustment mechanism mounting part in an up and down direction.

6. The vehicle seat according to claim 1, wherein the coupling member and the reclining mechanism are welded and connected, and an upper part of the coupling member is formed to align with a shape of the reclining mechanism, and a welded portion between the coupling member and the reclining mechanism is configured to align with the shape of the reclining mechanism.

7. The vehicle seat according to claim 1, wherein the reclining mechanism is mounted to the upper part of the coupling member, and the seat cushion frame is welded and connected to the lower part of the coupling member, and the lower part of the coupling member is configured larger than the upper part thereof.

8. The vehicle seat according to claim 1, wherein the seat cushion frame is provided with a height adjustment mechanism mounting part to which a height adjustment mechanism for displacing a height of the seat cushion frame with respect to a vehicle floor is mounted, the height adjustment mechanism is configured as a link mechanism, and the height adjustment mechanism mounting part is provided as a hole part in which a link central axis or a link driving member is arranged, and the lower part of the coupling member is curved towards a rear side of the seat cushion frame and in a direction away from the height adjustment mechanism mounting part when mounted to the rear end side of the seat cushion frame.

9. The vehicle seat according to claim 1, wherein the seat cushion frame is provided with a height adjustment mechanism mounting part to which a height adjustment mechanism for displacing a height of the seat cushion frame with respect to a vehicle floor is mounted, the height adjustment mechanism is configured as a link mechanism, and the height adjustment mechanism mounting part is provided as a hole part in which a link central axis or a link driving member is arranged, and the metal member provided on the rear end side of the seat cushion frame extends to a position surrounding the height adjustment mechanism mounting part.

10. The vehicle seat according to claim 1, wherein the seat cushion frame is provided with a height adjustment mechanism configured as a link mechanism for displacing a height of the seat cushion frame with respect to a vehicle floor, the height adjustment mechanism is provided with a brake pinion mechanism for restricting an action of the link mechanism, the seat cushion frame is provided with a brake member arrangement hole in which the brake pinion mechanism is arranged, and the metal member provided on the rear end side of the seat cushion frame extends to a position surrounding the brake member arrangement hole.

11. The vehicle seat according to claim 1, wherein the metal member is arranged on at least a part of an outside surface of a rear end of the seat cushion frame and on at least a part of an upper side surface extending and bending inward from an upper part of the outside surface, at least a part of the metal member is formed as a convex part protruding outward, at least a part of the convex part is exposed outward, and the coupling member is welded and connected to an outward exposed portion of the convex part in a state that the metal member portion arranged on the outside surface and the upper side surface of the rear end of the seat cushion frame is covered.

12. The vehicle seat according to claim 1, wherein the metal member is configured as an iron pin comprising a head and a leg, the iron pin is fixed to the seat cushion frame in such a manner that the head is arranged inward and a free end side of the leg is arranged outward, the coupling member is provided with a coupling member-side iron pin through-hole through which the leg passes, and the coupling member is mounted to the seat cushion frame by welding connection in a contact part of the leg and the coupling member-side iron pin through-hole in a state that the metal member portion arranged on an outside surface and an upper side surface of a rear end of the seat cushion frame is covered and the leg is inserted through the coupling member-side iron pin through-hole.

13. The vehicle seat according to claim 1, wherein the metal member is arranged on at least a part of an outside surface of a rear end of the seat cushion frame and on at least a part of an upper side surface extending and bending inward from an upper part of the outside surface and extends from a back toward a front of the outside surface while avoiding an upper edge part and a lower edge part of the outside surface, and the coupling member is welded and connected at a covering portion in a state that the metal member portion arranged on the outside surface and the upper side surface of the rear end of the seat cushion frame is covered.

14. A vehicle seat comprising:

a seat back frame on which a reclining mechanism is arranged at a lower part thereof; and a seat cushion frame made at least partly of a resin material, wherein the reclining mechanism, arranged on a lower end side of the seat back frame, and a rear end side of the seat cushion frame are coupled with a metallic coupling member, a metal member is integrally formed on the rear end side of the seat cushion frame, an upper part of the coupling member is mounted to the reclining mechanism, and a lower part of the coupling member is welded and connected to the metal member provided on the rear end side of the seat cushion frame, the seat cushion frame is provided with a height adjustment mechanism mounting part to which a height adjustment mechanism for displacing a height of the seat cushion frame with respect to a vehicle floor is mounted, and the metal member extends to a position aligned with at least a part of the height adjustment mechanism mounting part in an up and down direction.

15. A vehicle seat comprising:

a seat back frame on which a reclining mechanism is arranged at a lower part thereof; and a seat cushion frame made at least partly of a resin material, wherein the reclining mechanism, arranged on a lower end side of the seat back frame, and a rear end side of the seat cushion frame are coupled with a metallic coupling member, a metal member is integrally formed on the rear end side of the seat cushion frame, an upper part of the coupling member is mounted to the reclining mechanism, and a lower part of the coupling member is welded and connected to the metal member provided on the rear end side of the seat cushion frame, the metal member is arranged on at least a part of an outside surface of a rear end of the seat cushion frame and on at least a part of an upper side surface extending and bending inward from an upper part of the outside surface, at least a part of the metal member is formed as a convex part protruding outward, at least a part of the convex part is exposed outward, and the coupling member is welded and connected to an outward exposed portion of the convex part in a state that the metal member portion arranged on the outside surface and the upper side surface of the rear end of the seat cushion frame is covered.

* * * * *